United States Patent
Amit et al.

(10) Patent No.: US 12,516,313 B2
(45) Date of Patent: Jan. 6, 2026

(54) METHOD FOR STABILIZING INTRACELLULAR RNA

(71) Applicant: Yeda Research and Development Co. Ltd., Rehovot (IL)

(72) Inventors: Ido Amit, Rehovot (IL); Ido Yofe, Rehovot (IL); Diego Jaitin, Rehovot (IL); Yonatan Katzenelenbogen, Rehovot (IL); Mami Lennikov, Rehovot (IL); Assaf Weiner, Rehovot (IL); Hadas Keren-Shaul, Rehovot (IL)

(73) Assignee: Yeda Research and Development Co. Ltd., Rehovot (IL)

( * ) Notice: Subject to any disclaimer, the term of this patent is extended or adjusted under 35 U.S.C. 154(b) by 879 days.

(21) Appl. No.: 17/619,722

(22) PCT Filed: Jun. 16, 2020

(86) PCT No.: PCT/IL2020/050664
§ 371 (c)(1),
(2) Date: Dec. 16, 2021

(87) PCT Pub. No.: WO2020/255124
PCT Pub. Date: Dec. 24, 2020

(65) Prior Publication Data
US 2022/0307008 A1  Sep. 29, 2022

Related U.S. Application Data

(60) Provisional application No. 62/967,633, filed on Jan. 30, 2020.

(30) Foreign Application Priority Data

Jun. 16, 2019 (IL) .......................................... 267399
Jul. 7, 2019 (IL) .......................................... 267901

(51) Int. Cl.
| | | |
|---|---|---|
| *C12N 15/10* | (2006.01) | |
| *C12N 15/11* | (2006.01) | |
| *C12Q 1/6806* | (2018.01) | |

(52) U.S. Cl.
CPC ........ *C12N 15/1003* (2013.01); *C12N 15/111* (2013.01); *C12Q 1/6806* (2013.01);
(Continued)

(58) Field of Classification Search
None
See application file for complete search history.

(56) References Cited

U.S. PATENT DOCUMENTS 6,204,375 B1 * 3/2001 Lader ................... C12Q 1/6806
536/25.4

FOREIGN PATENT DOCUMENTS

CN   112662561 A * 4/2021
WO   WO 92/09704   6/1992
(Continued)

OTHER PUBLICATIONS

International Search Report and the Written Opinion Dated Sep. 17, 2020 From the International Searching Authority Re. Application No. PCT/IL2020/050664. (18 Pages).
(Continued)

*Primary Examiner* — David W Berke-Schlessel

(57) ABSTRACT

A method of permeabilizing a cell is disclosed. Kits for permeabilizing cells and analysing RNA contents are also disclosed.

3 Claims, 17 Drawing Sheets
Specification includes a Sequence Listing.

(52) U.S. Cl.
CPC ...... *C12N 2320/50* (2013.01); *C12N 2509/10* (2013.01); *C12Q 2600/178* (2013.01)

(56) References Cited

FOREIGN PATENT DOCUMENTS

| WO | WO 00/06780 | 2/2000 |
|---|---|---|
| WO | WO 2020/255124 | 12/2020 |

OTHER PUBLICATIONS

Office Action and Search Report Dated Jan. 29, 2020 From the Israel Patent Office Re. Application No. 267399. (7 Pages).
Alles et al. "Cell Fixation and Preservation for Droplet-Based Single-Cell Transcriptomics", BMC Biology, XP055521622, 15(1): 44-1-44-14, Published Online May 19, 2017.
Chen et al. "PBMC Fixation and Processing for Chromium Single-Cell RNA Sequencing", Journal of Translational Medicine, XP055726683, 16(1): 198-1-198-11, Jul. 17, 2018.
Esser et al. "Isolation of Full-Size mRNA FRom Ethanol-Fixed Cells After Cellular Immunofluorescence-Activated Cell Sorting (FACS)", Cytometry, XP055727056, 21(4): 382-386, Dec. 1, 1995.
Katzenelenbogen et al. "Coupled ScRNA-Seq and Intracellular Protein Activity Reveal an Immunosuppressive Role of TREM2 in Cancer", Cell, XP055726934, 182(4): 872-885, Aug. 20, 2020.
Najafi "RNA Preservation and Stabilization", Biochemistry & Physiology, XP055370710, 3(1): 1000126-1-1000126-4, Published Online Feb. 10, 2014.
Salomon et al. "Droplet-Based Single Cell RNASeq Tools: A Practical Guide", Lap on a Chip, XP055701515, 19(10): 1706-1727, Published Online May 14, 2019.
Communication Pursuant to Article 94(3) EPC Dated Feb. 4, 2025 From the European Patent Office Re. Application No. 20737607.0 (8 Pages).

\* cited by examiner

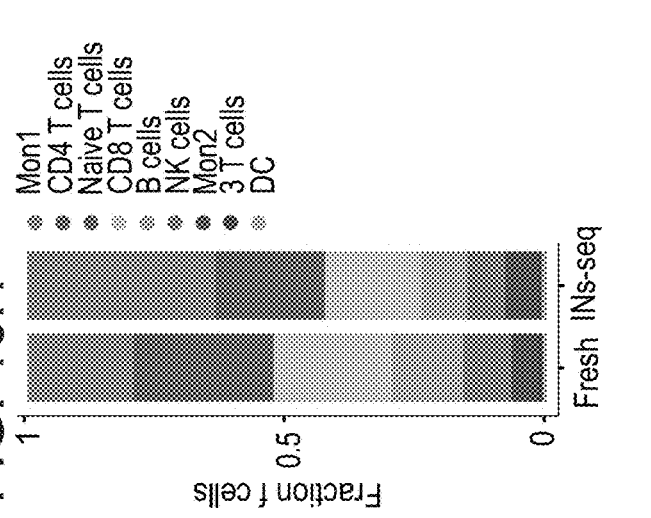
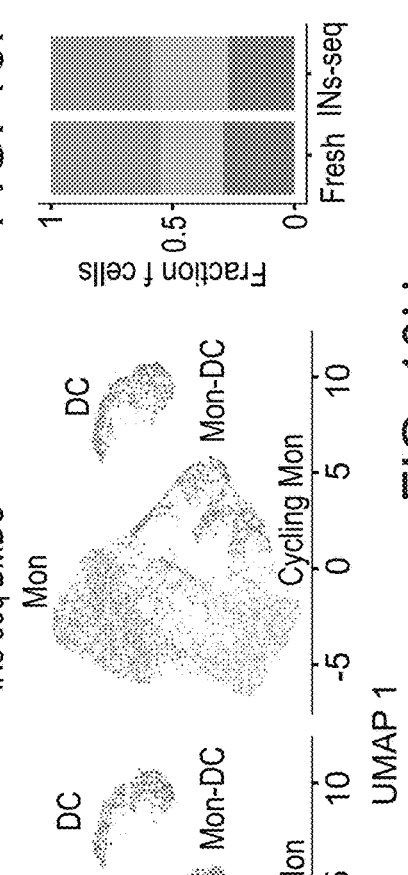
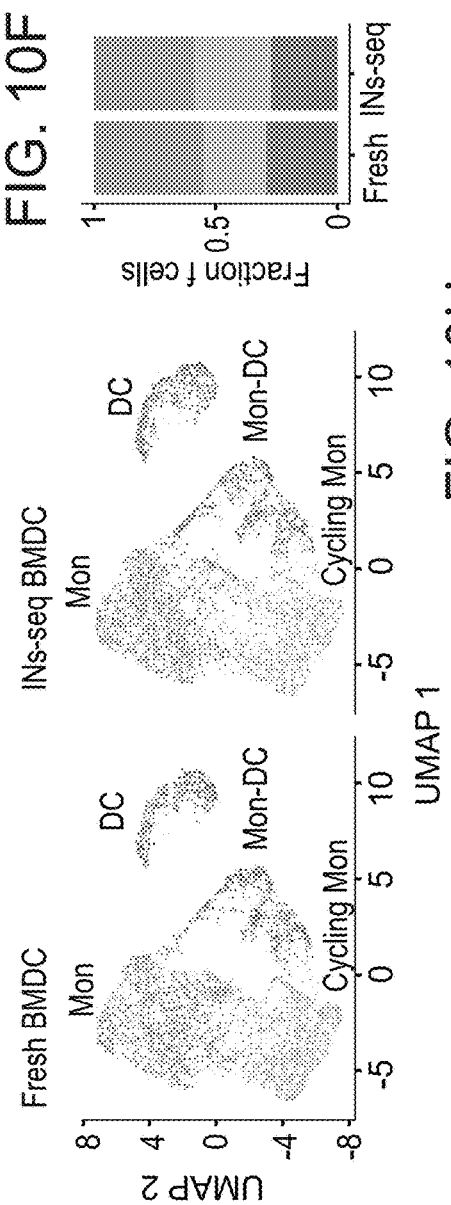
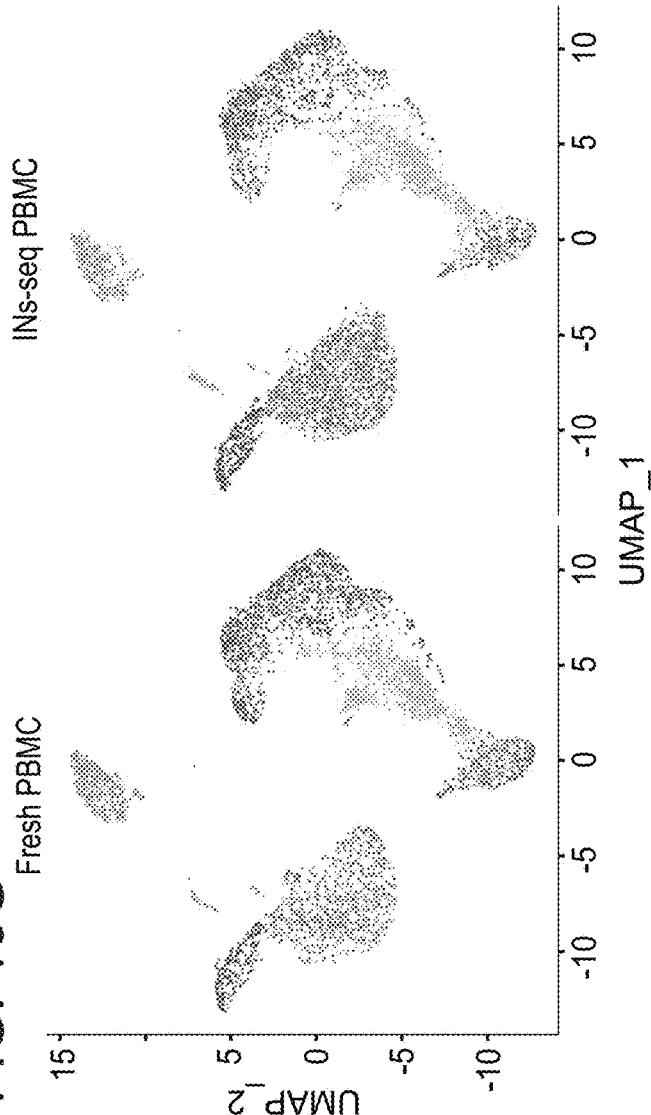

METHOD FOR STABILIZING INTRACELLULAR RNA

RELATED APPLICATIONS

This application is a National Phase of PCT Patent Application No. PCT/IL2020/050664 having International filing date of Jun. 16, 2020, which claims the benefit of priority of Israeli Patent Application Nos. 267399 filed on Jun. 16, 2019 and 267901 filed on Jul. 7, 2019.

PCT Patent Application No. PCT/IL2020/050664 also claims the benefit of priority under 35 USC § 119 (e) of U.S. Provisional Patent Application No. 62/967,633 filed on Jan. 30, 2020.

The contents of the above applications are all incorporated by reference as if fully set forth herein in their entirety.

SEQUENCE LISTING STATEMENT

The ASCII file, entitled 90101SequenceListing.txt, created on Dec. 16, 2021, comprising 2,901 bytes, submitted concurrently with the filing of this application is incorporated herein by reference. The sequence listing submitted herewith is identical to the sequence listing forming part of the international application.

FIELD AND BACKGROUND OF THE INVENTION

The present invention, in some embodiments thereof, relates to a method for stabilizing intracellular RNA and, more particularly, but not exclusively, in permeabilized cells.

While the combination of surface protein measurement and RNA analysis at a single cell level is widely practiced, the ability to also quantify intracellular markers combined with single cell RNA sequencing is not yet possible. Intracellular staining requires fixation of cells prior to staining. This step aims to achieve morphological preservation while allowing the antibody to bind its specific epitope. Fixation can be accomplished by either chemical or physical methods. The chemical methods include cross-linking agents such as formaldehyde, glutaraldehyde and disodium-phosphate (DSP), as well as solvents, such as ethanol and methanol. In order to allow access for intracellular antigens, cells must be permeabilized immediately after the fixation process. Two general types of reagents are commonly used: organic solvents, such as methanol and acetone, and detergents such as saponin, Triton X-100 and Tween-20. Due to their property to dissolve lipids from cell membranes, making them permeable to antibodies and also coagulate proteins, organic solvents can be used to fix and permeabilize cells at the same time. Interestingly, fixation and permeabilization have been shown to have negative effect on RNA integrity, severely damaging downstream gene expression analysis. Another approach commonly used is formaldehyde fixation, which cross-links nucleic acids and proteins. However, formaldehyde causes chemical modifications of RNA, DNA and proteins. It compromises nucleic acid integrity and limits the efficiency of isolation, detection, and accuracy of the transcriptional profile. A number of factors affect RNA detection by reverse-transcriptase (RT-PCR) in formaldehyde fixed tissue, including amplicon size and the time between fixation and nucleic acid isolation. To avoid formaldehyde and other cross-linking agents from affecting RNA survival, studies have indicated that non-cross-linking alcohol-based fixatives, such as ethanol and methanol, allow better downstream isolation of RNA, limiting cross-linking between nucleic acids and proteins.

Background art includes Alles et al., BMC Biology (2017) 15:44; Chen et al., Journal of Transl Med (2018) 16:198.

SUMMARY OF THE INVENTION

According to an aspect of the present invention there is provided a method of permeabilizing a cell comprising:
(a) contacting the cell with a solution of alcohol under conditions that fixes the cell;
(b) removing the solution of alcohol from the cell;
(c) contacting the cell with a salt solution, wherein the salt of the solution is at a concentration which inactivates enzymes of the cell whilst maintaining the integrity of the cell membrane of the cell;
(d) removing the salt solution from the cell; and subsequently
(e) contacting the cell with a buffer that preserves the integrity of the RNA of the cell, thereby permeabilizing the cell.

According to an aspect of the present invention there is provided a method of analyzing cellular RNA comprising:
(a) permeabilizing a plurality of cells according to the current invention;
(b) isolating the RNA from the cells; and
(c) analyzing the RNA, thereby analyzing cellular RNA.

According to an aspect of the present invention there is provided a kit comprising:
(i) a salt solution, wherein the salt of the solution is at a concentration which inactivates enzymes of the cell whilst maintaining the integrity of the cell membrane of the cell;
(ii) a buffer; and
(iii) RNase inhibitor.

According to embodiments of the present invention, the alcohol is methanol.

According to embodiments of the present invention, the solution of alcohol comprises an RNase inhibitor.

According to embodiments of the present invention, the salt comprises ammonium sulfate and/or cesium sulfate.

According to embodiments of the present invention, the salt consists of ammonium sulfate.

According to embodiments of the present invention, the salt solution comprises a divalent ion chelator and an RNase inhibitor.

According to embodiments of the present invention, the ammonium sulfate is present in the salt solution at a concentration between 2-5 M.

According to embodiments of the present invention, the ammonium sulfate is present in the salt solution at a concentration of about 3.3 M.

According to embodiments of the present invention, the pH of the salt solution is between 5 and 5.5.

According to embodiments of the present invention, the buffer is selected from the group consisting of saline sodium citrate (SSC), 4-(2-hydroxyethyl)-1-piperazineethanesulfonic acid (HEPES), SSPE, piperazine-N,N'-bis(2-ethanesulfonic acid) (PIPES), tetramethyl ammonium chloride cTMAC), Tris(hydroxymethyl)aminomethane (Tris), SET, citric acid, potassium phosphate and sodium pyrophosphate.

According to embodiments of the present invention, the buffer is saline sodium citrate (SSC), wherein the concentration of sodium chloride is from 150 mM to 700 mM and the concentration of sodium citrate is from 10 mM to 70 mM.

According to embodiments of the present invention, the concentration of the sodium chloride is 0.15 M and the concentration of sodium citrate is 0.015 M.

According to embodiments of the present invention, the concentration of the sodium chloride is 0.45 M and the concentration of sodium citrate is 0.045 M.

According to embodiments of the present invention, the buffer comprises at least one component selected from the group consisting of a reducing agent, a protein and an RNase inhibitor.

According to embodiments of the present invention, the method further comprises rinsing the cell with a buffer comprising an RNase inhibitor between steps b) and c) and/or between steps d) and e).

According to embodiments of the present invention, the cell is an immune cell.

According to embodiments of the present invention, a membrane protein of the cell is labeled.

According to embodiments of the present invention, the method further comprises labeling an intracellular protein or nucleic acid of the cells with a tag, following the permeabilizing and prior to the isolating.

According to embodiments of the present invention, the method further comprises isolating individual cells from the plurality of cells following the isolating and prior to the analyzing.

According to embodiments of the present invention, the method further comprises sorting the cells according to the tag.

According to embodiments of the present invention, the tag is a fluorescent tag.

According to embodiments of the present invention, the tag is a nucleic acid tag.

According to embodiments of the present invention, the method further comprises isolating individual cells from the plurality of cells following the labeling and prior to the analyzing.

According to embodiments of the present invention, the analyzing is effected at the single cell level.

According to embodiments of the present invention, the analyzing comprises whole cell sequencing of the RNA.

According to embodiments of the present invention, the salt is ammonium sulfate.

According to embodiments of the present invention, the buffer is selected from the group consisting of saline sodium citrate (SSC), 4-(2-hydroxyethyl)-1-piperazineethanesulfonic acid (HEPES), SSPE, piperazine-N,N'-bis(2-ethanesulfonic acid) (PIPES), tetramethyl ammonium chloride cTMAC), Tris(hydroxymethyl)aminomethane (Tris), SET, citric acid, potassium phosphate and sodium pyrophosphate.

According to embodiments of the present invention, the buffer is saline sodium citrate (SSC), wherein the concentration of sodium chloride is from 150 mM to 700 mM and the concentration of sodium citrate is from 10 mM to 70 mM.

According to embodiments of the present invention, a concentration of the ammonium sulfate is between 2-5 M.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 10A-H: INs-seq: an integrated technology for scRNA-seq and intracellular protein measurements. A. Schematics of INs-seq experimental approach. B. Flow cytometry histogram of pP38 fluorescent intensity of fresh cells, INS-seq, PFA-fixed, methanol-fixed and DSP-fixed cells (dark grey for LPS treated cells and light grey for control) C. qPCR Ct values of mouse Actb cDNA after reverse transcription (cDNA-Ct) and reverse transcription followed by PCR amplification (amplified cDNA-Ct) for INs-seq BMDC and other fixation protocols. D. Violin plots of gene count and unique molecular identifier (UMI) count of 5476 fresh and 5454 INs-seq BMDC E. UMAP of scRNA-seq data from fresh and INs-seq CD11c+Ly6G−

BMDC. Color code for cell type assignment as indicated in the plot, with (F) the fraction of the different cell types in each sample. G. UMAP of scRNA-seq data from 9053 fresh and 5620 INs-seq fixed human blood PBMC (CD45+ immune cells). Color code for cell type assignment as indicated in the plot, with (H) the fraction of the different cell types in each sample.

FIGS. 11A-G: INs-seq detects phospho-p38 MAPK activity in BMDC culture following LPS stimulation. A. Flow cytometry histogram of pP38 signal in LPS treated and control BMDC, gating strategy for pP38+ and pP38− cells is shown B. UMAP representation of QC-positive scRNA-seq data of 4169 INs-seq pP38+ and pP38− cells. Different colors represent different cell population as indicated in the plot. C. UMAP split to 2091 INs-seq pP38+ cells and 2078 pP38− BMDC. D. Relative fraction of the 4 clusters in pP38+ and pP38− samples (left). log2 plot of pP38+ over pP38− for each cell population (right) E. Average UMI count of Myd88, Tlr4 and Cd14 in each cell population. F. Flow cytometry histogram plots of pP38 fluorescent signal of CD11c+MHCII$^{high}$ and CD11c+MHCII$^{mid}$ BMDC G. qPCR analysis (ΔΔCt) of Tnf, Cxcl2 and Il-1b in LPS-stimulated CD11c+MHCII$^{high}$ and CD11c+MHCII$^{mid}$ BMDC compared to control BMDC.

Figure 12B:
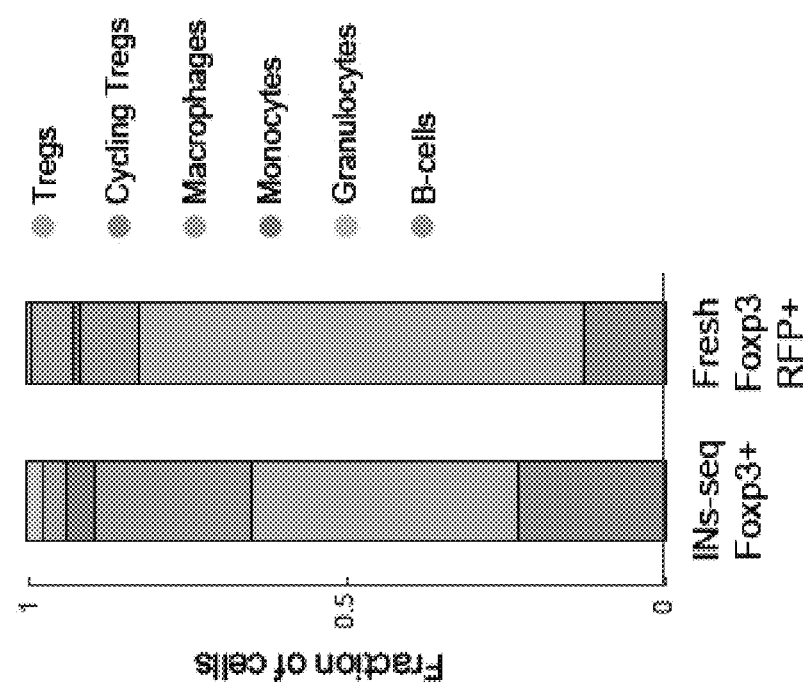
Figure 12A:
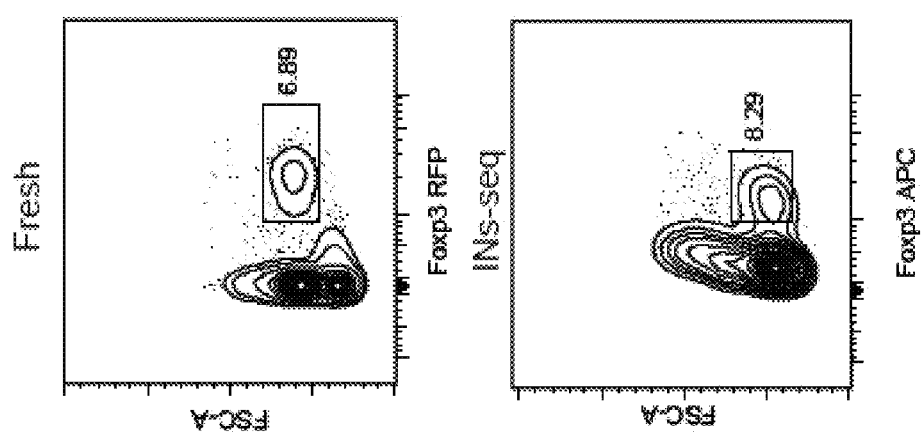
Figure 12C:
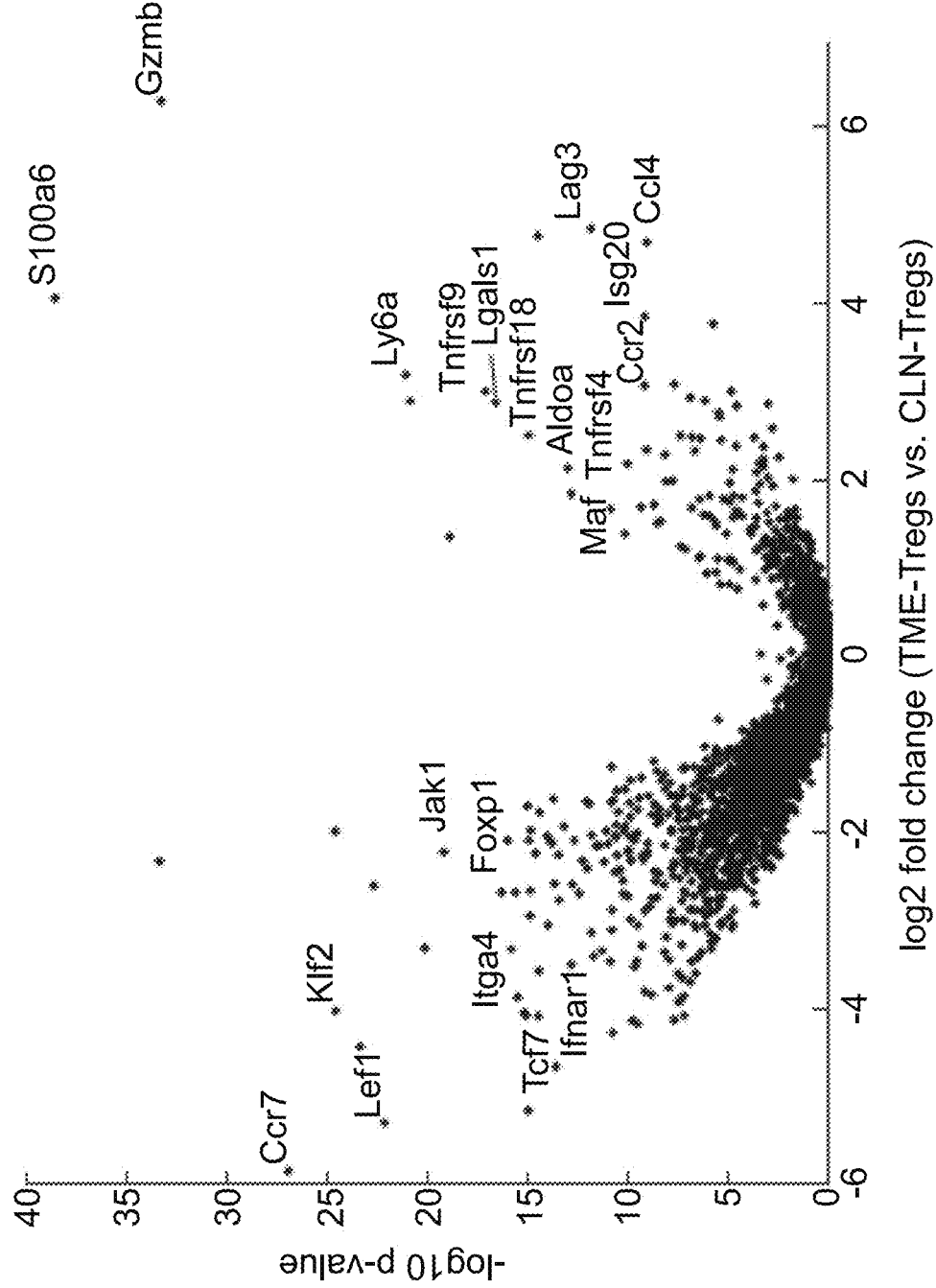

FIGS. 12A-C: Characterization of T cell subtypes by INS-seq transcription factors maps. A. FACS plots showing the gating strategy for fresh CD3$^+$Foxp3$^{RFP+}$ and INs-seq CD3$^+$APC-Foxp3 population isolated from (Tg(Foxp3-RFP, -cre) CLN B. Percentage of the different clusters in fresh CD3$^+$Foxp3$^{RFP+}$ compared to INs-seq CD3+APC-Foxp3. C. Volcano plot showing the gene expression fold change of TME Tregs versus CLN Tregs (x-axis) and their Mann-whitney p-values (y-axis).

DESCRIPTION OF SPECIFIC EMBODIMENTS OF THE INVENTION

The present invention, in some embodiments thereof, relates to a method for stabilizing intracellular RNA and, more particularly, but not exclusively, in permeabilized cells.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

A crucial step for preserving RNA from methanol-fixed cells is the rehydration step. This step involves removal of the methanol and replacement thereof with a water-based buffer. Previous methanol fixation protocols use PBS with RNASIN™ RNAse inhibitor) as a rehydration buffer (Alles et al., BMC Biology (2017) 15:44), and others use 3×SSC-based buffers for rehydration (Chen et al. 2018, Journal of Transl Med 16:198). However in both cases, major degradation is involved especially when profiling immune cells.

The present inventors have now discovered a novel protocol which dramatically increases both the quantity and quality of RNA in permeabilized cells. This is important for a number of analyses including analysis of RNA in intracellular protein-stained cells, especially at the single cell level.

Figure 6:
FIG. 6 is single cell RNA sequencing clustering data from ki67+ and Ki67− cells.
Figure 7:
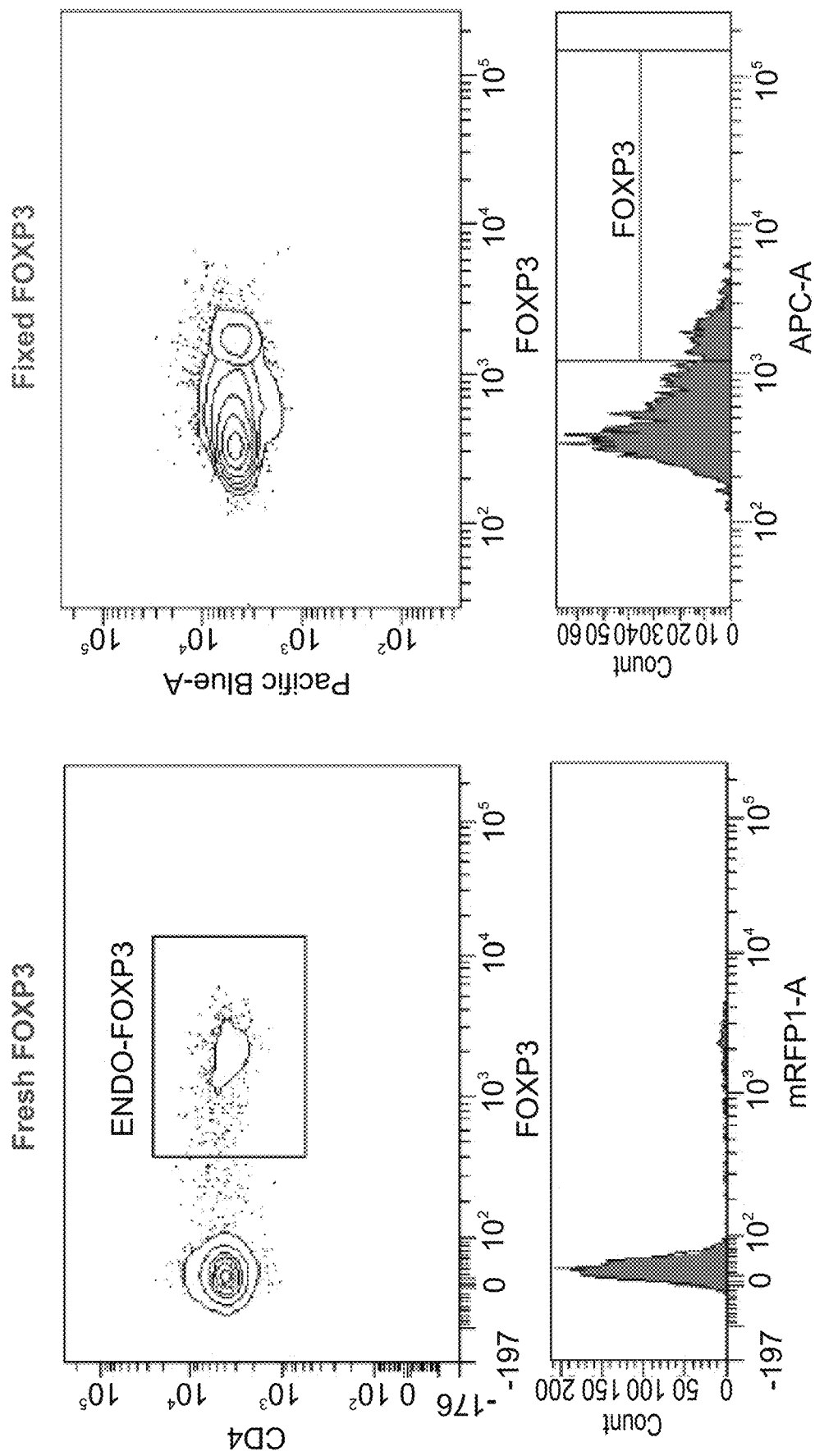
FIG. 7 illustrates the transcription factor FOXP3 FACS gating for genetically modified cells expressing fluorescent FOXP3 (fresh) and the same cell population that were fixed and stained with a FOXP3 fluorescent antibody (fixed).
Figure 8:
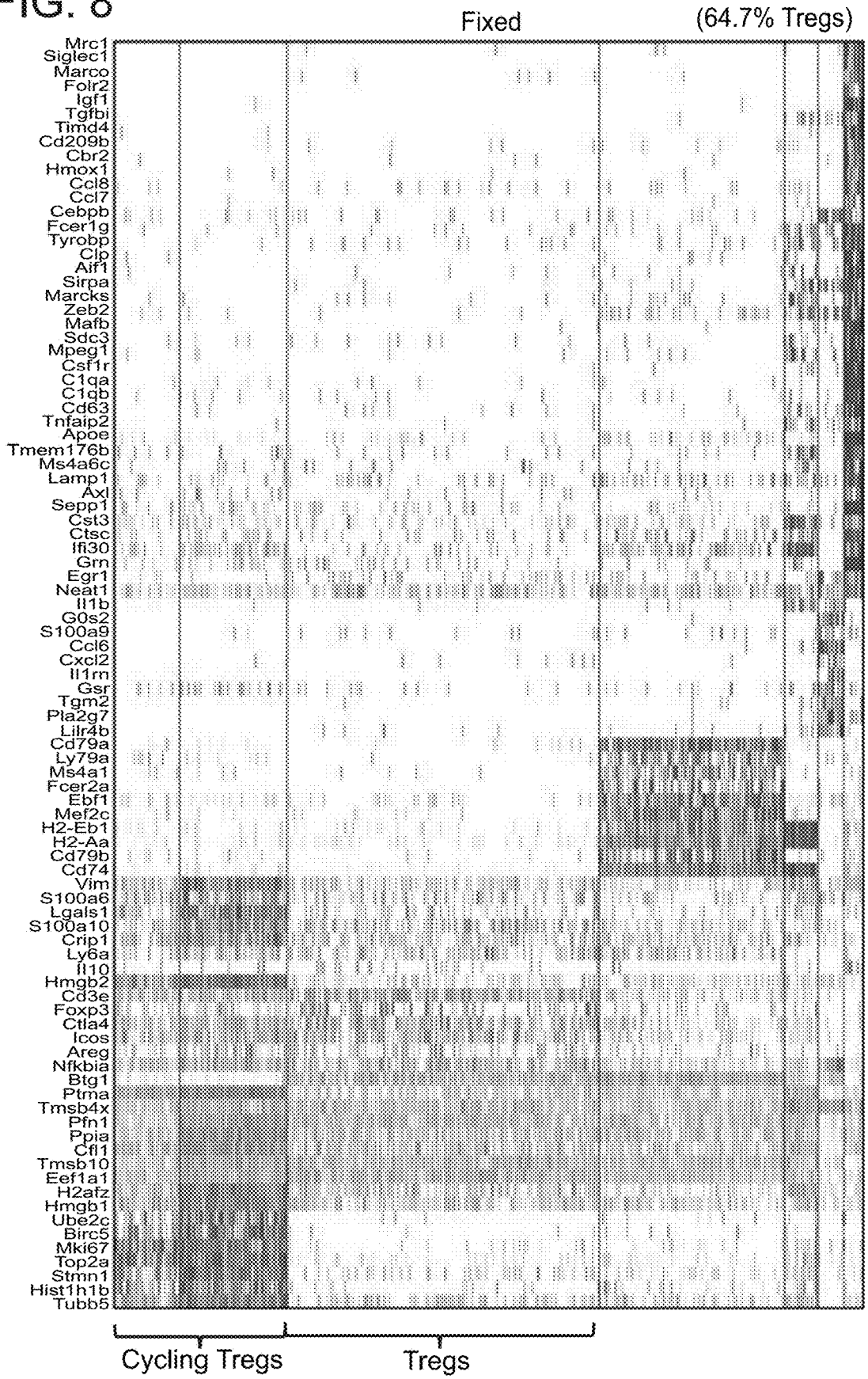
FIG. 8 is single cell RNA sequencing clustering data from fresh and fixed cells.
Figure 8:
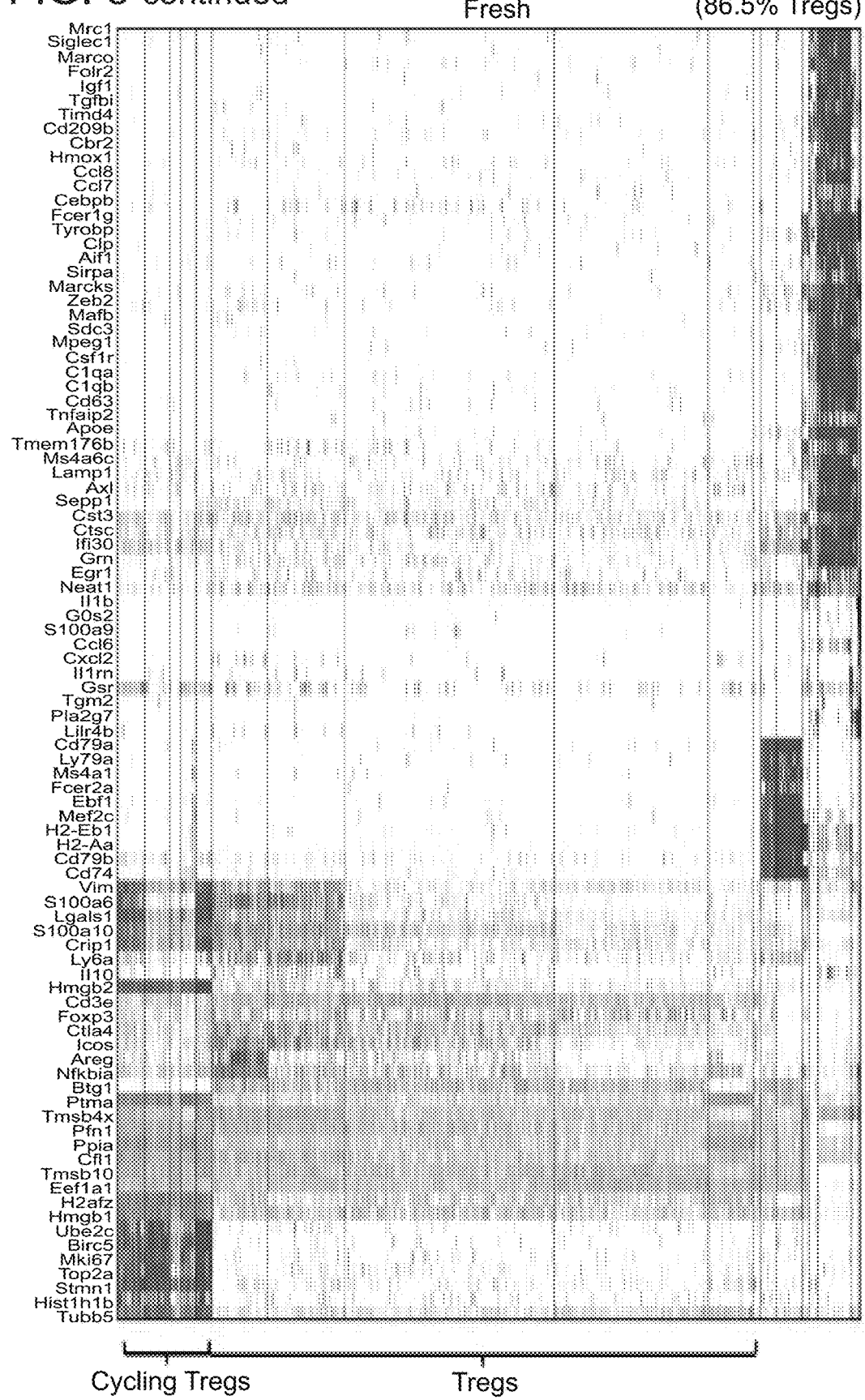
Figure 9A:
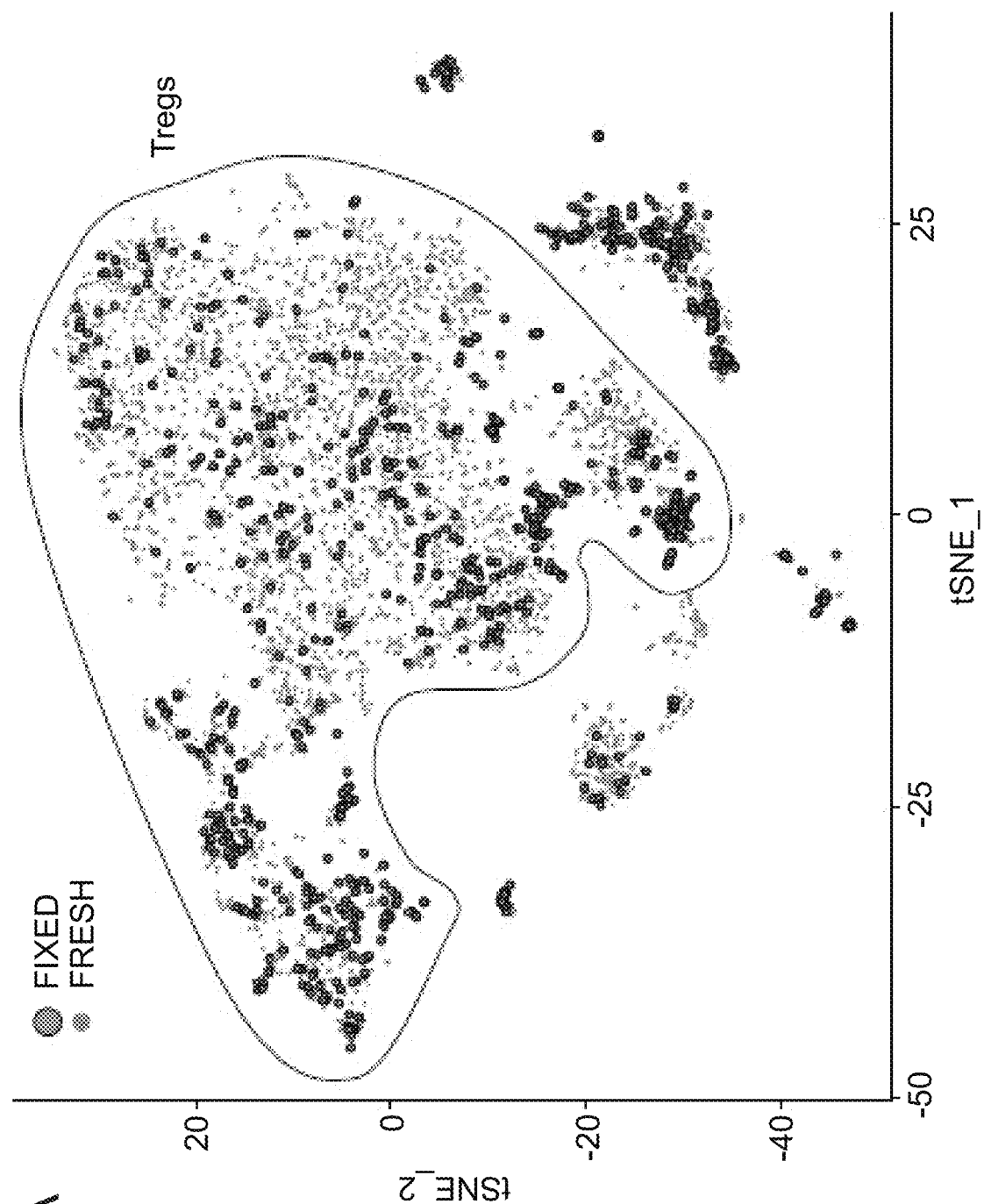
FIGS. 9A-B illustrates a Seurat CCA analysis which anchors fixed and fresh scRNA sequencing data together.
Figure 9B:
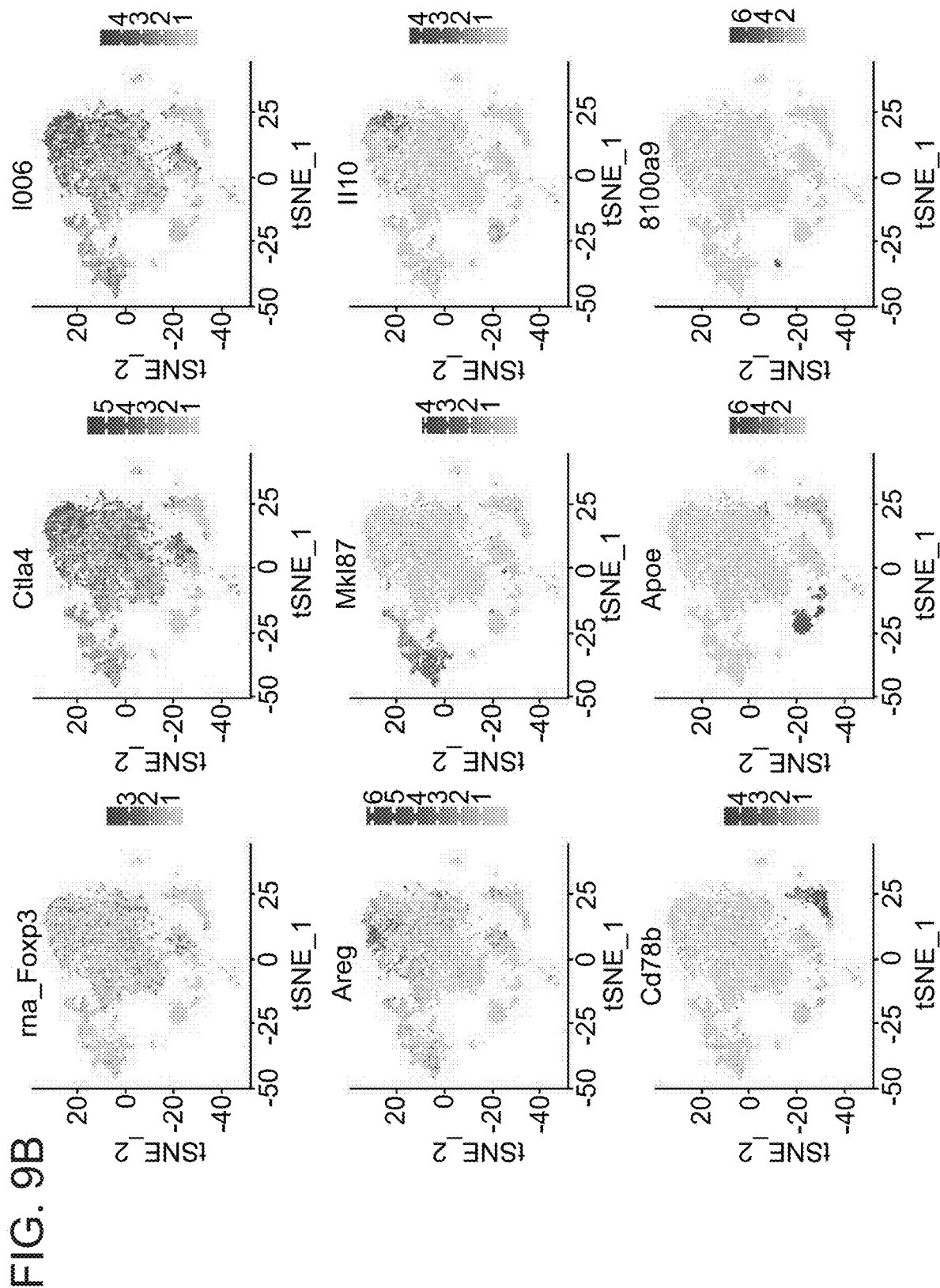

Whilst reducing the present invention to practice, the present inventors showed that their method enhanced RNA preservation in both cultured and non-cultured cells. In addition, the present inventors showed that by carrying out the novel method disclosed, a permeability of the cells can be obtained that allows for strong intracellular staining of proteins, whilst retaining sufficient membrane integrity that single cell analysis can be carried out. Thus, the present inventors showed that cells could initially be sorted into sub-populations according to an intracellular marker by FACs analysis and subsequently analyzed at the single cell level by RNA sequencing (FIG. 6).

The method was shown to work in a wide variety of both animal cells (bone marrow derived dendritic cells, lymph nodes, spleen and tumor cells) and human cells (e.g. blood cells).

Thus, according to a first aspect of the present invention, there is provided a method of permeabilizing a cell comprising:

(a) contacting the cell with a solution of alcohol under conditions that fixes the cell;

(b) removing the solution of alcohol from the cell;

(c) contacting the cell with a salt solution, wherein the salt of the solution is at a concentration which inactivates enzymes of the cell whilst maintaining the integrity of the cell membrane of the cell;

(d) removing the salt solution from the cell; and subsequently (e) contacting the cell with a buffer that preserves the integrity of the RNA of the cell, thereby permeabilizing the cell.

The term "cell" as used herein refers to a biological cell.

Obtaining cellular samples is carried out according to methods known in the art.

The cells may be obtained from a body fluid (e.g. blood) or a body tissue. The cells may be obtained directly from a subject (e.g. mammalian subject, human subject) i.e. non-cultured, or may be part of a cell culture. The cells may arise from a healthy organism, or one that is diseased or suspected of being diseased. According to a particular embodiment, each sample comprises cells of a particular cell type (i.e. a homogeneous population of cells). Thus, for example one of the samples may comprise granulocytes, another of the samples may comprise macrophages, another of the samples may comprise monocytes etc. The samples of a single cell type may be obtained using methods known in the art—for example by FACs sorting (according to an extracellular marker). According to still another embodiment, each sample comprises cells from a particular source (e.g. from a particular subject).

According to another embodiment, the cells comprise immune cells (e.g. white blood cells).

According to still another embodiment, the cells comprise tumor cells.

According to another embodiment, the surface of the cells are labeled with a label (e.g. an antibody that binds to a membrane protein which is attached to a detectable moiety).

The detectable moiety can be a label which is directly visualized (e.g., a fluorescent molecule, a radioactive molecule) or a member of a binding (affinity) pair, which is identifiable via its interaction with an additional member of the binding pair (e.g., antibody-antigen pairs, enzyme-substrate pairs). Table 1, hereinbelow, provides examples of sequences of identifiable moieties.

TABLE 1

| Identifiable Moiety | Amino Acid sequence (Genebank Accession No.) | Nucleic Acid sequence (Genebank Accession No.) |
|---|---|---|
| Green Fluorescent protein | AAL33912 | AF435427 |
| Alkaline phosphatase | AAK73766 | AY042185 |
| Peroxidase | NP_568674 | NM_124071 |
| Histidine tag | AAK09208 | AF329457 |
| Myc tag | AF329457 | AF329457 |
| Biotin lygase tag | NP_561589 | NC_003366 |
| orange fluorescent protein | AAL33917 | AF435432 |
| Beta galactosidase | NM_125776 | NM_125776 |
| Fluorescein isothiocyanate | AAF22695 | AF098239 |
| Streptavidin | S11540 | S11540 |

The alcohol of this aspect of the present invention may be any alcohol which permeabilizes the cell membrane—e.g. methanol or ethanol.

According to a particular embodiment the alcohol is methanol.

According to a particular embodiment, the methanol is chilled—e.g. between −20° C. to 4° C.), for example about −20° C.

The alcohol may further release endonuclease or exonuclease activity and/or comprise endonuclease or exonuclease inhibitors (e.g. an RNAse inhibitor).

An RNAse inhibitor is an agent capable of preventing the enzymatic degradation of mRNA and/or total RNA. In one embodiment, the RNAse inhibitor is a recombinant protein. In another embodiment, the RNAse inhibitor is extracted from an animal.

Examples of commercially available RNAse inhibitors include, but are not limited to Superase-In (Ambion Inc.) and RNASIN™ Plus RNase Inhibitor (Promega).

The cell is contacted with the alcohol under conditions that allow both cell fixation and permeabilization of the cell membrane. The permeabilization/fixation should be such that an antibody is capable of passing through the cell membrane and binding to its corresponding antigen.

Exemplary conditions are 5-20 minutes (e.g. about 10 minutes). The permeabilization/fixation may be carried out at 0-25° C., more preferably at temperatures below 10° C. and even more preferably below 4° C. The permeabilization/fixation may be carried out in the absence of light.

Following fixation and permeabilization, the alcohol is removed from the cells (e.g. following centrifugation) and the cells are rehydrated.

Optionally, the cells are washed to remove any residual alcohol prior to the rehydration step. The cells may be washed with a buffer (e.g. PBS). In one embodiment, the wash further comprises an endonuclease or exonuclease inhibitors (e.g. RNase inhibitor, as detailed herein above).

The rehydration buffer (also referred to herein as a salt solution) comprises sufficient salt that enzymes of the cell are inactivated, whilst the cell membrane of the cell remains intact. The integrity of the membrane is such that the ability to carry out single cell analysis following the rehydration step is retained.

Exemplary salts that can be used to carry out the rehydration include ammonium sulfate and/or cesium sulfate.

According to a particular embodiment, the salt of the rehydration solution consists of ammonium sulfate.

An exemplary concentration of salt in the salt solution is between 2-5 M.

An exemplary concentration of ammonium sulfate in the salt solution is between 2-5 M, more preferably between 2-4.3 M (for example about 3.3 M).

The salt solution may comprise additional components including but not limited to a divalent ion chelator (e.g. EDTA or EGTA) and an endonuclease or exonuclease inhibitors (e.g. RNase inhibitor).

The pH of the salt solution is typically between 5 and 5.5, for example 5.2. Acids (such as sulfuric acid or hydrochloric acid) may be used to titrate the solution so that the optimal pH is reached.

The cells are contacted with the salt solution for a sufficient amount of time that allows for enzyme inactivation, but not for too much time that the cell membrane is compromised. Thus, for example the present inventors contemplate contacting the cells with the salt solution for 5-30 minutes, 5-20 minutes, 5-15 minutes (for example about 10 minutes). According to a specific embodiment, the contacting is carried out in the dark.

Following removal of the salt solution (e.g. after centrifugation), the cells are contacted with a buffer that preserves the integrity of the RNA of the cell. Optionally, the cells are first rinsed with a wash to remove any remnants of the salt solution. Examples of washes are provided herein above.

The buffer comprises at least one buffering agent. A buffering agent is a weak acid or base used to maintain the acidity (pH) of a solution near a chosen value after the addition of another acid or base. That is, the function of a buffering agent is to prevent a rapid change in pH when acids or bases are added to the solution. The buffering agent of the disclosed buffer is capable of maintaining the pH of the buffer composition at or near physiological pH.

Examples of buffers that preserve the integrity of the RNA of the cell include, but are not limited to saline sodium citrate (SSC), 4-(2-hydroxyethyl)-1-piperazineethanesulfonic acid (HEPES), SSPE, piperazine-N,N'-bis(2-ethanesulfonic acid) (PIPES), tetramethyl ammonium chloride cTMAC), Tris(hydroxymethyl)aminomethane (Tris), SET, citric acid, potassium phosphate and sodium pyrophosphate.

In certain embodiments, the buffering agent is saline sodium citrate (SSC). This buffering agent combines sodium citrate and sodium chloride, which allows it to maintain the pH of the buffer composition at a specific pH, which includes at or near physiological pH.

In certain embodiments, SSC comprises a mixture of 3 M NaCl and 0.3 M sodium citrate at a pH of 7.0, known as 20×SSC. 20×SSC may be diluted to provide the mixture of NaCl and sodium citrate in lower concentrations. For example, 2×SSC is a solution of 20×SSC diluted by a factor of 10, resulting in a solution with 0.3 M (300 mM) NaCl and 0.03 M (30 mM) sodium citrate. Likewise, 0.5×SSC is a solution of 20×SSC diluted by a factor of 40, resulting in a solution with 0.075 M (75 mM) NaCl and 0.0075 M (7.5 mM) sodium citrate.

In one embodiment, the buffer is 1×SSC.

In another embodiment, the buffer is 3×SCC.

The buffer composition may comprise about 5 mM to about 100 mM, about 5 mM to about 20 mM, about 5 mM to about 15 mM, or about 5 mM to about 10 mM of the buffering agent. The buffer compositions may comprise about 5 mM, about 6 mM, about 7 mM, about 7.5 mM, about 8 mM, about 9 mM, about 10 mM, about 15 mM, about 20 mM, about 25 mM, about 30 mM, about 35 mM, about 40 mM, about 45 mM, about 50 mM, about 60 mM, about 70 mM, about 75 mM, about 80 mM, about 90 mM, or about 100 mM of the buffering agent.

In certain embodiments, the concentration recited for the buffering agent refers to the concentration of sodium citrate in the buffer. When using SSC, NaCl is also present at a concentration that is a factor of 10 greater than the concentration of sodium citrate.

The buffer composition may comprise about 5 mM to about 100 mM, about 5 mM to about 50 mM, about 5 mM to about 20 mM, about 5 mM to about 15 mM, or about 5 mM to about 10 mM sodium citrate. The buffer composition may comprise about 5 mM, about 6 mM, about 7 mM, about 7.5 mM, about 8 mM, about 9 mM, about 10 mM, about 15 mM, about 20 mM, about 25 mM, about 30 mM, about 35 mM, about 40 mM, about 45 mM, about 50 mM, about 60 mM, about 70 mM, about 80 mM, about 90 mM, or about 100 mM sodium citrate.

The buffer may comprise about 50 mM to about 500 mM, about 50 mM to about 100 mM, about 50 mM to about 90 mM, about 50 mM to about 80 mM, about 60 mM to about 80 mM, about 60 mM to about 75 mM, or about 70 mM to about 80 mM sodium chloride. The buffer composition may comprise about 50 mM, about 55 mM, about 60 mM, about 65 mM, about 70 mM, about 75 mM about 80 mM, about 85 mM, about 90 mM, about 100 mM, about 150 mM, about 200 mM, about 300 mM, about 400 mM, about 450 mM or about 500 mM sodium chloride.

The buffer of this aspect of the present invention may comprise additional agents including a protein (e.g. a serum albumin, a reducing agent and/or an endonuclease or exonuclease inhibitors (e.g. RNAse inhibitor).

Serum albumin, often referred to simply as blood albumin, is a globular protein that in humans is encoded by the ALB gene. Serum albumin is produced by the liver, occurs dissolved in blood plasma and is the most abundant blood protein in mammals. The serum albumin that may be used in the present invention may be, for example, bovine serum albumin, human serum albumin, goat serum albumin, mammalian albumin, or any combination thereof. In a particularly preferred embodiment, the serum albumin is bovine serum albumin (BSA).

The serum albumin may be employed in the solution at a concentration in the range 0.05-1.2% (w/v). For example, the serum albumin may be used at a concentration in the range 0.01-1.2% (w/v), 0.02-1.2% (w/v), 0.03-1.2% (w/v), 0.04-1.2% (w/v), 0.03-0-08% (w/v) or 0.03-0.06% (w/v). In a preferred embodiment, the serum albumin is used at a concentration in the range of about 0.04% (w/v).

Examples of reducing agents include, but are not limited to Tris(2-carboxyethyl)phosphine (TCEP), dithiothreitol (DTT) and beta-mercaptoethanol.

In some embodiments, the concentration of reducing agent in the buffer is at least 1, 2, 3, 4, 5, 6, 7, 8, 9, 10, 11, 12, 13, 14, 15, 16, 17, 18, 19, or 20 mM, e.g., at least 20 mM, e.g., between 20-50 mM, e.g. 40 mM.

The permeabilization method described herein is particularly useful if it is desirable to analyze cellular RNA.

Thus, according to another aspect of the present invention, there is provided a method of analyzing cellular RNA comprising:
(a) permeabilizing a plurality of cells, as described herein;
(b) isolating the RNA from the cells; and
(c) analyzing the RNA, thereby analyzing cellular RNA.

Methods of isolating RNA are known in the art and include for example.

The RNA may comprise total RNA, mRNA, mitochondrial RNA, chloroplast RNA, DNA-RNA hybrids, viral RNA, snoRNA, miRNA and mixtures thereof.

Isolating RNA from cells generally includes treating the cells in such a manner that the RNA present in the sample is extracted and made available for analysis. Any isolation method that results in extracted RNA may be used in the practice of the present invention. It will be understood that the particular method used to extract RNA will depend on the nature of the source.

Methods of RNA extraction are well-known in the art and further described herein under.

Phenol based extraction methods: These single-step RNA isolation methods based on Guanidine isothiocyanate (GITC)/phenol/chloroform extraction require much less time than traditional methods (e.g. $CsCl_2$ ultracentrifugation). Many commercial reagents (e.g. Trizol, RNAzol, RNAWIZ) are based on this principle. The entire procedure can be completed within an hour to produce high yields of total RNA.

Silica gel-based purification methods: RNeasy is a purification kit marketed by Qiagen. It uses a silica gel-based membrane in a spin-column to selectively bind RNA larger than 200 bases. The method is quick and does not involve the use of phenol.

In one embodiment, the cells are treated such that single cells are captured in individual wells.

Once isolated from the cell (and optionally, the RNA is analyzed.

In one embodiment, the analysis is an analysis of the sequence of the RNA.

The analysis may be a quantitative and/or a qualitative analysis.

Methods of Analyzing and/or Quantifying RNA

Northern Blot analysis: This method involves the detection of a particular RNA in a mixture of RNAs. An RNA sample is denatured by treatment with an agent (e.g., formaldehyde) that prevents hydrogen bonding between base pairs, ensuring that all the RNA molecules have an unfolded, linear conformation. The individual RNA molecules are then separated according to size by gel electrophoresis and transferred to a nitrocellulose or a nylon-based membrane to which the denatured RNAs adhere. The membrane is then exposed to labeled DNA probes. Probes may be labeled using radio-isotopes or enzyme linked nucleotides. Detection may be using autoradiography, colorimetric reaction or chemiluminescence. This method allows both quantitation of an amount of particular RNA molecules and determination of its identity by a relative position on the membrane which is indicative of a migration distance in the gel during electrophoresis.

RT-PCR analysis: This method uses PCR amplification of relatively rare RNAs molecules. First, RNA molecules are purified from the cells and converted into complementary DNA (cDNA) using a reverse transcriptase enzyme (such as an MMLV-RT) and primers such as, oligo dT, random hexamers or gene specific primers. Then by applying gene specific primers and Taq DNA polymerase, a PCR amplification reaction is carried out in a PCR machine. Those of skills in the art are capable of selecting the length and sequence of the gene specific primers and the PCR conditions (i.e., annealing temperatures, number of cycles and the like) which are suitable for detecting specific RNA molecules. It will be appreciated that a semi-quantitative RT-PCR reaction can be employed by adjusting the number of PCR cycles and comparing the amplification product to known controls.

Single Cell Transcriptome Analysis

This method relies on sequencing the transcriptome of a single cell. In one embodiment a high-throughput method is used, where the RNAs from different cells are tagged individually, allowing a single library to be created while retaining the cell identity of each read. The method can be carried out a number of ways—see for example PCT Publication No. WO2014/108850, Patent Application No. 20100203597 and US Patent Application No. 20180100201, the contents of which are incorporated herein by reference.

In one embodiment, mRNA from single cells which have been pre-sorted into cell capture plates is barcoded, converted into cDNA and pooled. Subsequently, the pooled sample is linearly amplified by T7 in vitro transcription, and the resulting RNA is fragmented and converted into a sequencing-ready library by tagging the samples with pool barcodes and Illumina sequences during ligation, reverse transcription, and PCR. It will be appreciated that in order to analyze the cells on a single cell basis, the cells are first distributed into wells, such that only 1 cell is present per well. The well typically comprises the lysis solution and barcoded poly(T) reverse-transcription (RT) primers for scRNA-seq.

Optionally, prior to the analysis and following the permeabilizing, the present invention contemplates labeling an intracellular protein or nucleic acid of the cells.

Methods of labeling intracellular proteins are known in the art and include the use of antibodies which are attached to a detectable moiety, examples of which are provided herein above.

Methods of labeling intracellular nucleic acids are known in the art and include the use of nucleic acid probes which are attached to a detectable moiety, examples of which are provided herein above.

According to a particular embodiment, the detectable moiety is a fluorescent moiety.

According to another embodiment, the detectable moiety is a nucleic acid tag.

If the antibody is attached to a fluorescent moiety, a cell population may be enriched for on the basis of expression of a particular intracellular marker by using a fluorescence-activated cell sorter (FACS).

A Flow Cytometer typically consists of a laser light source, flow measurement chamber, and an optical system consisting of lenses, filters, and light detectors. Two photomultiplier tubes (light detectors), one at 180 degrees and one at 90 degrees to the laser, are used to measure forward (FSC) and right-angle scatter (SSC), respectively. Three fluorescence detectors, each consisting of a filter and photomultiplier tube, are used to detect fluorescence. The three detectors sense green (FL1—530 nm), orange (FL2—585 nm), and red fluorescence (FL3—650 nm). Cells are identified by sort logic applied to all five of the detector signals (FSC, SSC, FL1, FL2, FL3) using a computer.

Exemplary Flow Cytometers that may be used in this aspect of the present invention are manufactured by companies such as Becton Dickinson (USA), Backman Coulter (USA), Partec (Germany).

The FACS machine may be set such that cells of a particular forward scatter and/or side scatter are selected. Forward-scattered light (FSC) is proportional to cell-surface area or size. FSC is a measurement of mostly diffracted light and is detected just off the axis of the incident laser beam in the forward direction by a photodiode. FSC provides a suitable method of detecting particles greater than a given size independent of their fluorescence.

According to a particular embodiment, droplet based microfluidics is used to separate single cells into droplets—see for example WO 2013134261, the contents of which are incorporated herein by reference.

According to a specific embodiment, the method comprises:

(a) Labeling the cells with an antibody that binds to a cell surface marker;
(b) Permeabilizing the cells (according to the methods described herein);
(c) Labeling the cells with an antibody that binds to an intracellular marker;
(d) Sorting the cells into populations which are positive/negative for the cell surface maker and positive/negative for the intracellular marker;
(e) Aliquoting the cells into single cell suspensions, such that each well of a plate comprises a single cell;
(f) Analyzing RNA of each cell (by single cell RNA sequencing).

Any of the compositions described herein for carrying out the method of the present invention may be comprised in a kit. In a non-limiting example the kit comprises the following components, each component being in a suitable container:

(i) a salt solution (e.g. ammonium sulfate solution), wherein the salt of the solution is at a concentration which inactivates enzymes of the cell whilst maintaining the integrity of the cell membrane of the cell, as further described herein above;
(ii) a buffer (e.g. SSC); and
(iii) an endonuclease or exonuclease inhibitors (e.g. RNase inhibitor).

In another non-limiting example the kit comprises additional components, for carrying out single cell sequencing such as barcodes, polydT oligonucleotide, T4 RNA ligase, RNAseH, DNase and/or a reverse transcriptase.

The containers of the kits will generally include at least one vial, test tube, flask, bottle, syringe or other containers, into which a component may be placed, and preferably, suitably aliquoted. Where there is more than one component in the kit, the kit also will generally contain a second, third or other additional container into which the additional components may be separately placed. However, various combinations of components may be comprised in a container.

When the components of the kit are provided in one or more liquid solutions, the liquid solution can be an aqueous solution. However, the components of the kit may be provided as dried powder(s). When reagents and/or components are provided as a dry powder, the powder can be reconstituted by the addition of a suitable solvent.

A kit will preferably include instructions for employing, the kit components as well the use of any other reagent not included in the kit. Instructions may include variations that can be implemented.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Generally, the nomenclature used herein and the laboratory procedures utilized in the present invention include molecular, biochemical, microbiological and recombinant DNA techniques. Such techniques are thoroughly explained in the literature. See, for example, "Molecular Cloning: A laboratory Manual" Sambrook et al., (1989); "Current Protocols in Molecular Biology" Volumes I-III Ausubel, R. M., ed. (1994); Ausubel et al., "Current Protocols in Molecular Biology", John Wiley and Sons, Baltimore, Maryland (1989); Perbal, "A Practical Guide to Molecular Cloning", John Wiley & Sons, New York (1988); Watson et al., "Recombinant DNA", Scientific American Books, New York; Birren et al. (eds) "Genome Analysis: A Laboratory Manual Series", Vols. 1-4, Cold Spring Harbor Laboratory Press, New York (1998); methodologies as set forth in U.S. Pat. Nos. 4,666,828; 4,683,202; 4,801,531; 5,192,659 and 5,272,057; "Cell Biology: A Laboratory Handbook", Volumes I-III Cellis, J. E., ed. (1994); "Culture of Animal Cells—A Manual of Basic Technique" by Freshney, Wiley-Liss, N. Y. (1994), Third Edition; "Current Protocols in Immunology" Volumes I-III Coligan J. E., ed. (1994); Stites et al. (eds), "Basic and Clinical Immunology" (8th Edition), Appleton & Lange, Norwalk, CT (1994); Mishell and Shiigi (eds), "Selected Methods in Cellular Immunology", W. H. Freeman and Co., New York (1980); available immunoassays are extensively described in the patent and scientific literature, see, for example, U.S. Pat. Nos. 3,791,932; 3,839,153; 3,850,752; 3,850,578; 3,853,987; 3,867,517; 3,879,262; 3,901,654; 3,935,074; 3,984,533; 3,996,345; 4,034,074; 4,098,876; 4,879,219; 5,011,771 and 5,281,521; "Oligonucleotide Synthesis" Gait, M. J., ed. (1984); "Nucleic Acid Hybridization" Hames, B. D., and Higgins S. J., eds. (1985); "Transcription and Translation" Hames, B. D., and Higgins S. J., eds. (1984); "Animal Cell Culture" Freshney, R. I., ed. (1986); "Immobilized Cells and Enzymes" IRL Press, (1986); "A Practical Guide to Molecular Cloning" Perbal, B., (1984) and "Methods in Enzymology" Vol. 1-317, Academic Press; "PCR Protocols: A Guide To Methods And Applications", Academic Press, San Diego, CA (1990); Marshak et al., "Strategies for Protein Purification and Characterization—A Laboratory Course Manual" CSHL Press (1996); all of which are incorporated by reference as if fully set forth herein. Other general references are provided throughout this document. The procedures therein are believed to be well known in the art and are provided for the convenience of the reader. All the information contained therein is incorporated herein by reference.

Example 1

Materials and Methods
In Vitro Culture of BM-Derived DCs (BMDCs)

Bone marrow cells were harvested from naïve C57BL/6 mice. The cells were cultured in RPMI-1640 medium supplemented with 10% Fetal bovine serum (FBS), 100 U/ml penicillin, 2 mM glutamine, 0.1 mM nonessential amino acids, 1 mM sodium pyruvate. Subsequently, recombinant murine granulocyte-macrophage colony-stimulating factor (GM-CSF) (PeproTech, USA) was added into the medium to a final concentration of 10 ng/mL.

The cells were cultured at 37° C. in an incubator containing 5% $CO_2$. The culture medium was replaced 72 h later to remove the unattached cells and cell debris, then the fresh medium was supplemented with GM-CSF.
In Vivo Isolation of Splenic Cells Naïve C57BL/6, 15 week-old female mice spleen cells were isolated by using a protocol that have previously reported for the isolation of follicular dendritic cells (Sato et al., Mol. Immunol. 2016, 78:140-145). In brief, the spleen was crushed in ice-cold MACS buffer (Dulbecco's Phosphate Buffered Saline, 2% FCS, 5 mM EDTA), and cell suspensions were passed through a 70 μm Falcon nylon cell strainer (Corning, NY, USA). For lysis of red blood cells, cells were incubated with 1 ml of red blood lysis buffer (Hybri-Max, Sigma) for 5 minutes at room temperature and washed once with 10 ml ice-cold PBS. Cells were then re-suspended in ice-cold MACS buffer.
Surface Staining The cells were collected (in vivo—as above, or in vitro—after 2 or 7 days), washed with PBS, and divided into several fractions of ~5×10$^6$ cells/100 μl. Cells were stained in ice cold Washing buffer (−/− Dulbecco's Phosphate Buffered Saline (Biological industries), 2% FCS (MP biochemical), 5 mM EDTA (Fluka analytical), 0.4 U/μL RNASIN™ Plus RNase Inhibitor (Promega)) with fluorochrome conjugated antibodies (final concentration of 5 μg/mL) on ice for 30 minutes in the dark. Cells with viability of greater than 90% were used and kept on ice for fixation and single cell RNA-Seq analysis (Jaitin et al, 2014, Science. 2014 Feb. 14; 343 (6172): 776-779).

Cell Fixation:

Between ~$1\times10^6$ and $5.0\times10^6$ cells in 1 volume (100 μl) of cold PBS-0.4 U/μL RNASIN™ Plus RNase Inhibitor (Promega) were fixed with 9 volumes (900 μl) of super-cold 100% methanol ($CH_3OH$, pre-chilled to −20° C.). To avoid cell clumping, methanol was added dropwise, while gently vortexing the cell suspension. The cells were fixed for 10 minutes on ice in the dark.

Rehydration:

Fixed cells were pelleted at 900 g for 3 minutes right following fixation. Methanol-PBS solution was completely removed. Cells were washed (not re-suspended) twice with ice-cold PBS-0.4 U/μL RNASIN™ Plus RNase Inhibitor without breaking the pellet, to remove the methanol. The cells were then re-suspended in a small volume (~80 μL) of high-salt rehydration buffer (for 5 ml buffer-3.9 ml 4.32 M ammonium sulfate solution (Thermo Fisher), 0.5 ml 0.5 M EDTA (Fluka analytical), 0.8 U/μL RNASIN™ (RNAse inhibitor) Plus RNase Inhibitor (Promega) and 6 μL Sulfuric acid (Sigma) to reach a final pH of 5.2) and kept on ice for 10 minutes in the dark. 1 ml washing buffer was added, and cells were then pelleted at 900 g for 3 minutes. To completely remove the high-salt rehydration buffer, cells were washed twice with ice-cold PBS-0.4 U/μL RNasin™ Plus RNase inhibitor without re-suspension.

Intracellular Staining:

Cells were re-suspended in an ice cold 100 μl Intra-staining buffer (−/− Dulbecco's Phosphate Buffered Saline (Biological industries), 2% FCS (MP biochemical), 15 mM EDTA (Fluka analytical), 0.4 U/L RNasin™ Plus RNase Inhibitor (Promega)) with fluorochrome conjugated antibodies (final concentration of 5 g/mL) on ice for 20 minutes in the dark. 1 ml intra-staining buffer was added on top of the 100 μl intra-staining buffer, and cells were pelleted at 900 g for 3 minutes.

Preservation:

Cells were re-suspended in 1 ml preservation buffer (1×SSC (Invitrogen), 0.04% BSA, 40 mM DTT (sigma) and 0.8 U/μL RNasin™ Plus RNase Inhibitor (Promega)) and kept on ice.

For FACS sorting—cells were passed through a 70 μm Falcon nylon cell strainer into FACS tubes for immediate single cell sorting into 384 capture plates. Tubes were kept on ice the entire time. RNA libraries were then made using MARS-seq technology (Jaitin et al, 2014 Science. 2014 Feb. 14; 343(6172): 776-779).

For 10× Protocols—Cells were passed through a 70 μm Falcon nylon cell strainer into FACS tubes for immediate bulk sorting into tubes. The tubes contained 1 ml of 1.6×SSC to get to a concentration of 1×SSC after bulk sorting of 200,000 cells. Tubes were kept on ice the entire time. Cells were counted after bulk sorting, pelleted and re-suspended in preservation buffer with concentration of 1000 cells/μl (minimum of 25,000 cells total). The preservation buffer is compatible with 10× protocols. Cells were kept on ice the entire time and immediately moved to 10× processing.

Results

In order to compare the present fixating method (where salts are used to inactivate enzyme activity whilst retaining an intact cell membrane) to existing fixation methods (where salts are not used to inactivate enzyme activity), the quality of RNA extracted out of each sample by using qPCR for a specific genes (Actb) was analyzed. The sequencing quality of RNA derived from single cells was also evaluated.

In the first experiment, CD11c+Ly6G− cultured BMDCs, a common immune culture system for myeloid cells, were tested under three different conditions: fresh cells, methanol-fixed cells with PBS+R RNASIN™ (RNAse inhibitor) rehydration and methanol-fixed cells using the high salt+RNASIN™ (RNAse inhibitor) rehydration buffer. The cells were FACS sorted into a 384 plate.

Figure 1:
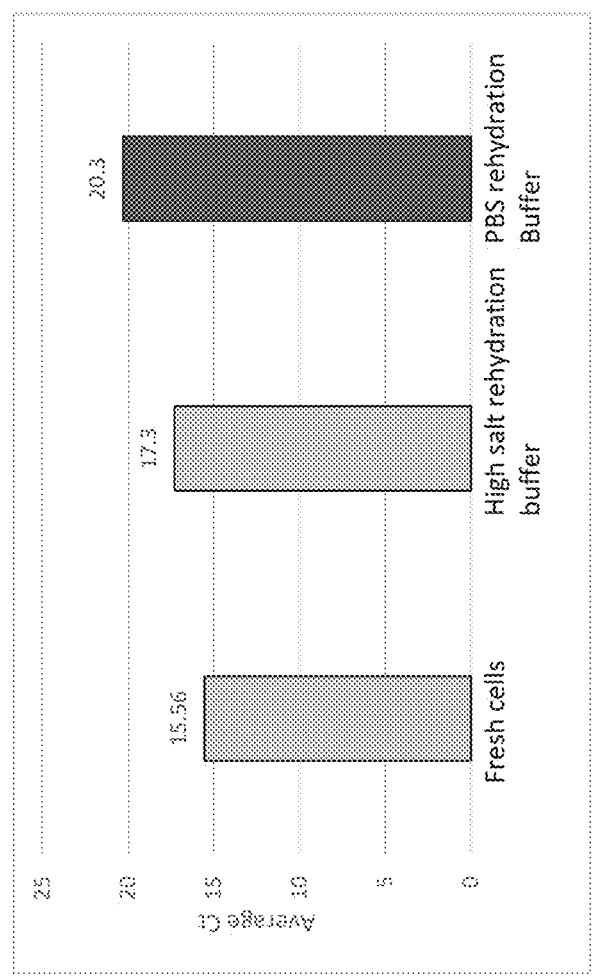
FIG. 1 is a bar graph illustrating the cycle threshold (ct) values of:
1. fresh, cultured cells;
2. fixed, cultured cells with PBS+RNASIN™ (RNAse inhibitor) rehydration buffer; and
3. fixed, cultured cells using the high salt+RNASIN™ (RNAse inhibitor) rehydration buffer.

As shown in FIG. 1, there is a significant difference between using rehydration with PBS+RNASIN™ (RNAse inhibitor) and using the high salt+RNASIN™ (RNAse inhibitor) rehydration buffer of the present invention. PBS caused almost $2^5$ loss in RNA quality, while the high salt rehydration buffer caused a relative mild loss of $2^{1.7}$ of the RNA quality.

In the next experiment, non-cultured spleen CD3-CD19− cells were tested under three different conditions: fresh cells, methanol-fixed cells with PBS+RNASIN™ (RNAse inhibitor) rehydration and methanol-fixed cells using the high salt+RNasin™ rehydration buffer. The cells were FACS sorted into a 384 plate.

Figure 2:
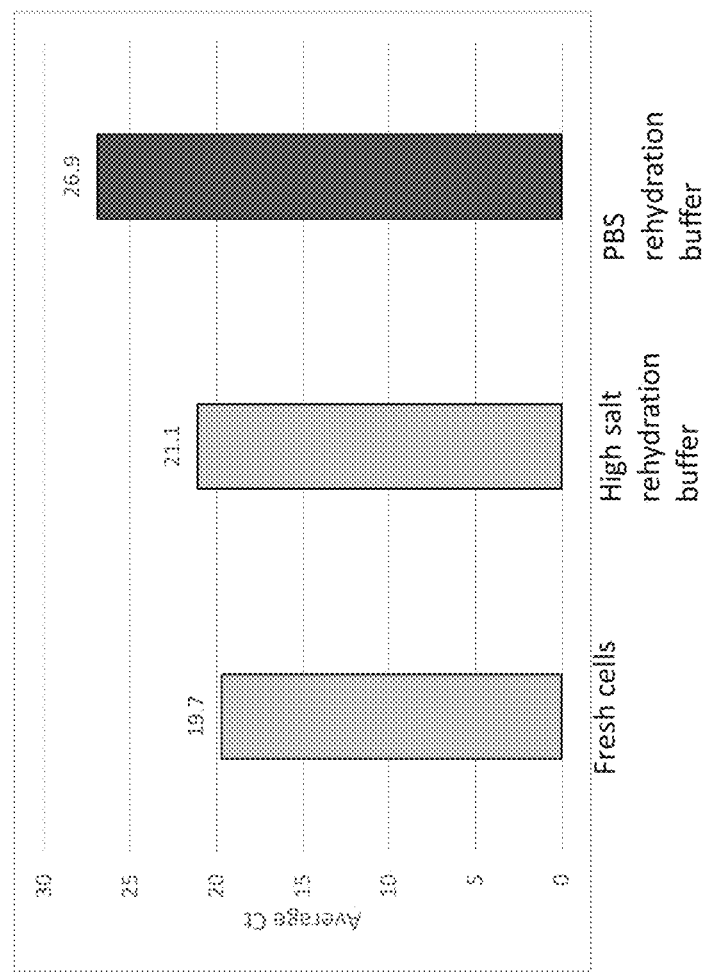
FIG. 2 is a bar graph illustrating the cycle threshold (ct) values of:
1. fresh, non-cultured cells;
2. fixed, non-cultured cells with PBS+RNASIN™ (RNAse inhibitor) rehydration buffer; and
3. fixed, no-cultured cells using the high salt+RNASIN™ (RNAse inhibitor) rehydration buffer.

As illustrated in FIG. 2, there is a significant difference between using rehydration with PBS+RNASIN™ (RNAse inhibitor) and using the high salt+RNASIN™ (RNAse inhibitor) rehydration buffer of the present invention: PBS caused more than $2^7$ loss in RNA quality, while the high salt rehydration buffer caused only $2^{1.4}$ quality loss.

In the next experiment, non-cultured spleen CD3+ T cells were tested under three different conditions: fresh cells, methanol-fixed cells with 3XSCC+RNASIN™ RNAse inhibitor) rehydration and methanol-fixed cells using the high salt+RNASIN™ (RNAse inhibitor) rehydration buffer. The cells were FACS sorted into a 384 plate.

Figure 3:
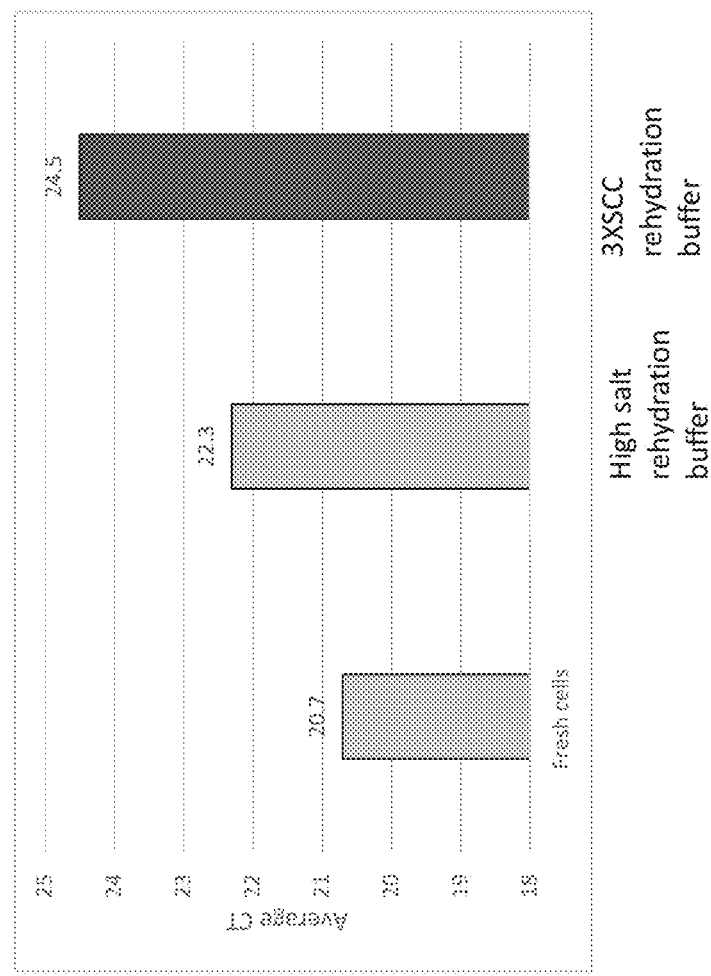
FIG. 3 is a bar graph illustrating the cycle threshold (ct) values of:
1. fresh, non-cultured cells;
2. fixed, non-cultured cells with 3XSCC+RNASIN™ (RNAse inhibitor) rehydration buffer; and
3. fixed, no-cultured cells using the high salt+RNASIN™ (RNAse inhibitor) rehydration buffer.

As illustrated in FIG. 3, there is a significant difference between using rehydration 3×SSC and using the high salt+RNASIN™ (RNAse inhibitor) rehydration buffer of the present invention: 3×SSC caused almost 24 loss in RNA quality, while the high salt+RNASIN™ (RNAse inhibitor) rehydration buffer of the present invention caused a mild loss of $2^{1.6}$ of the RNA quality.

Figure 4:
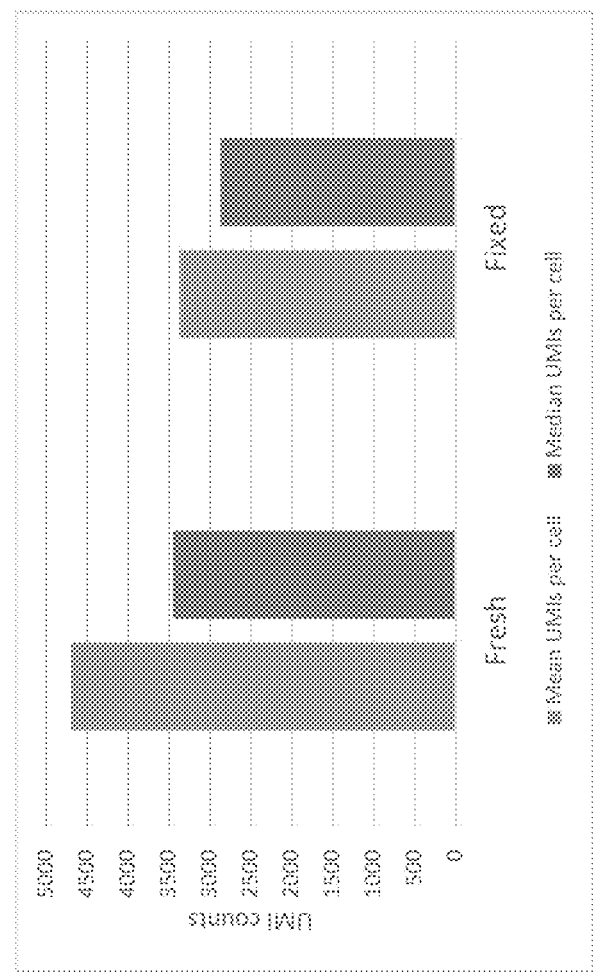
FIG. 4 is a bar graph comparing single cell RNA sequencing data from fresh and fixed cells using massively parallel single cell RNA-seq platforms (MARS-seq and 10× genomics).

The next experiment examined whether the fixation method described herein, preserves the RNA in a quality that is sufficient for scRNA sequencing. CD11b+ cultured BMDCs were examined, under two different conditions: fresh, and fixed using the high salt+RNASIN™ (RNAse inhibitor) rehydration buffer. The cells were FACS sorted into a 384 plate and processed by MARS-seq technique (Jaitin et al., 2014, Science. 2014 Feb. 14; 343 (6172): 776-779). The results are portrayed in FIG. 4. Table 2 portrays the results of CD11c+ cells under two different conditions: fresh, and fixed with the high salt+RNASIN™ (RNAse inhibitor) rehydration buffer. The cells were FACS sorted into a 384 plate and processed using the 10× Genomics system (chromium single cell technology).

TABLE 2

| Fixed | | Fresh | |
|---|---|---|---|
| Estimated no. of cells | 4,470 | Estimated no. of cells | 5,497 |
| Fraction reads in cells | 54.3% | Fraction reads in cells | 94.6% |
| Mean reads per cell | 67,595 | Mean reads per cell | 24,360 |
| Median gene per cell | 1,479 | Median gene per cell | 2,365 |

TABLE 2-continued

| Fixed | | Fresh | |
|---|---|---|---|
| Total genes detected | 15,868 | Total genes detected | 16,250 |
| Median UMI count per cell | 3,787 | Median UMI count per cell | 8,092 |

Figure 5:
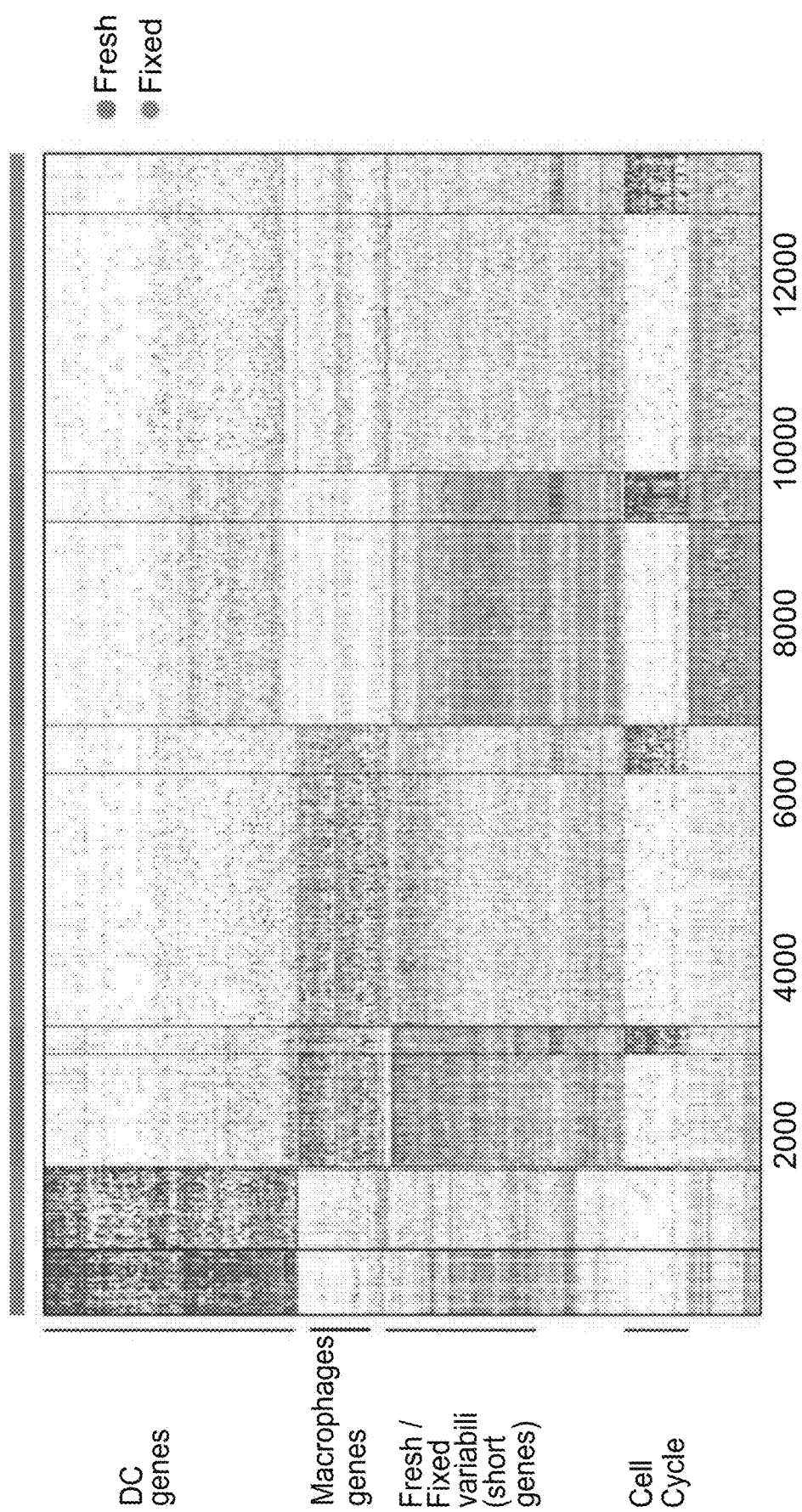
FIG. 5 is single cell RNA sequencing clustering data from fresh and fixed cells using the high salt+RNASIN™ (RNAse inhibitor) rehydration buffer.

FIG. 5 illustrates that the rehydration buffer comprising the high salt+RNASIN™ (RNAse inhibitor) preserved all cellular populations, presenting the exact same profile as the fresh cell sample.

The next experiment was performed in order to characterize populations according to the expression levels of an intracellular protein. CD11c+ cultured BMDCs were fixed using the high salt+RNASIN™ (RNAse inhibitor) rehydration buffer, and stained them with Ki67+ antibody. The cells were then FACS sorted into CD11c+Ki67+ fixed cells in one tube, and CD11c+Ki67− fixed cells into another tube. The RNA was then sequenced using 10x Genomics system.

As illustrated in FIG. 6, significantly different populations of cells were characterized that were originally separated from one another according to their Ki67 protein expression alone.

Example 2

Corroborating that the Method can be Used for Permeabilization of Non-cultured Cells The cervical LN was removed from two mRFP-FOXP3 mice and placed on ice. The tissue was dissociated using 100 μg/ml liberase and 100 μg/ml Dnase in IMDM, 20 min, 37° C. and passed through a 18 g syringe. After another 15 minutes of dissociation, the tissue was passed through a 18 g syringe, and then through a 21 g syringe. IMDM was added and the mixture was then passed through a strainer. The cells were centrifuged at 380 g, 5 min, 4° C. Next, the cells were re-suspended with MACS buffer and FC blocked for 5 min on ice. FACS surface staining was carried out for 30 min of ice with the following antibodies:
  CD45-eFlour450 (1:00)
  CD4-PE/cy7 (1:00)
  CD3-FITC (1100)

The samples were washed and divided into 2 tubes: 1 fresh and 1 for fixation. The fresh sample was kept on ice. The fixed sample was stained for intracellular FOXP3 using anti-FOXP3 antibody which was labelled with Allophycocyanin (APC).

FACS bulk sorting of 10,000 Fresh CD45+CD3+CD4+FOXP3/mRFP+ cells for one tube and 10,000 fixed CD45+CD3+CD4+FOXP3/APC cells for another tube.

The cells were then prepared for single cell RNA sequencing on the Chromium Single Cell 5' Library & Gel Bead Kit.

Results

As illustrated in FIGS. 7, 8 and 9A-B, the RNA of the cells that were fluorescently stained for FOXP3 using the fixation method of the present invention was sufficiently preserved such that it was possible to cluster the same populations from both fresh and fixed cells.

Example 3

INs-seq Fixation and Intracellular Staining Protocol
1-Cell Surface Staining

Cells or tissue from in vitro and in vivo experiments respectively were dissociated into single cell suspension and washed with 10 ml cold PBS. Cells were stained in ice cold washing buffer (−/− Dulbecco's Phosphate Buffered Saline (Biological industries), 0.5% BSA (MP-Biomedicals), 2 mM EDTA (Merck)) with fluorophores conjugated antibodies (final concentration of 5 μg/mL) on ice for 30 minutes in the dark.

2-INs-seq Fixation

Surface-stained cells were washed in 10 ml washing buffer and centrifuged at 400 g for 5 minutes. Cell pellet ($1\times10^6$-$5\times10^6$ cells) was resuspended in 1 volume (100 μl) of cold PBS (0.4 U/μL RNASIN™ Plus RNase Inhibitor (Promega)). Cell suspension was fixed with 9 volumes (900 μl) of cold 100% methanol (Bio-Lab) (pre-chilled to −20° C.) for 10 minutes on ice in the dark. To avoid cell clumping, methanol was added in drops, while gently vortexing the cell suspension.

Fixed cells were pelleted at 900 g for 3 minutes right after fixation. Methanol-PBS solution was completely discarded. Cell pellet was washed (not resuspended) twice with ice-cold PBS (0.4 U/μL RNASIN™ Plus RNase Inhibitor) without breaking the pellet, for complete removal of methanol leftovers. Cell pellet was resuspended in 100 μL of enzyme blocking buffer containing ammonium sulfate solution (Thermo Fisher), 0.05M EDTA (Sigma), 0.8 U/μL RNASIN™ Plus RNase Inhibitor, pH of 5.2) and kept on ice for 10 minutes in the dark.

3-Intracellular Staining:

To wash enzyme blocking buffer solution, 1 ml washing buffer (0.4 U/μL RNASIN™ Plus RNase inhibitor) was added, cells then were pelleted at 900 g for 3 minutes. To completely remove enzyme blocking buffer, cell pellet was washed twice with ice-cold washing buffer (0.4 U/μL RNASIN™ Plus RNase inhibitor) without re-suspension. Cell pellet was then incubated in the dark for 20 minutes with 100 μl intracellular staining buffer (−/− Dulbecco's Phosphate Buffered Saline (Biological industries), 0.5% BSA (MP biochemical), 2M EDTA (Sigma) with the desired intracellular antibody). At the end of the incubation, 1 ml washing buffer (0.4 U/μL RNASIN™ Plus RNase inhibitor) was added on top of the 100 μl intracellular staining buffer, cells were pelleted at 900 g for 3 minutes. Cell pellet was resuspended in 1 ml preservation buffer, filtered with 70 um nylon mesh and kept on ice until cell sorting.

Fixation and Intracellular Staining Methods
1-Cell Surface Staining

Cells or tissue from in vitro and in vivo experiments respectively were dissociated into single cell suspension and washed with 10 ml cold PBS. Cells were stained in ice cold washing buffer (−/− Dulbecco's Phosphate Buffered Saline (Biological industries), 0.5% BSA (MP-Biomedicals), 2 mM EDTA (Merck)) with fluorophores conjugated antibodies (final concentration of 5 μg/mL) on ice for 30 minutes in the dark.

2-Fixation Methods

Methanol based cell fixation protocol: adopted from (Alles et al. 2017). Surface-stained cells were washed in 10 ml washing buffer and centrifuged at 400 g for 5 minutes. Cells were handled in regular microcentrifuge tubes to minimize cell loss and kept cold at all times. Cells were resuspended in 100 μl of ice-cold PBS. To avoid cell clumping, 8 volumes (800 μl) of methanol (pre-chilled to −20° C.) were added dropwise, while gently mixing or vortexing the cell suspension (final concentration: 90% methanol in PBS). The methanol-fixed cells were kept on ice for a minimum of 15 min. For rehydration, cells were pelleted at 900 g for 4 min, rehydrated in PBS (0.01% BSA, 1 U/μl RNASIN™ Plus RNase inhibitor) pelleted, centrifuged, resuspended again in PBS (0.01% BSA, 1 U/μl RNAse inhibitor) and filtered with 70 um nylon mesh and kept on ice until cell sorting.

PFA based—Surface-strained cells were washed in 10 ml washing buffer and centrifuged at 400 g for 5 minutes. True-Nuclear Transcription Factor Buffer Set commercial kit was done according to the published protocol. Cells were filtered with 70 um nylon mesh and kept on ice until cell sorting.

DSP based cell fixation protocol: was adopted from (Gerlach et al. 2019). Surface-strained cells were washed in 10 ml washing buffer and centrifuged at 400 g for 5 minutes. Cells were fixed using a combination of 2.5 mM DSP (Thermo Scientific) and 2.5 mM SPDP (Thermo Scientific) in DMSO for 45 minutes in 200 mM Sodium Phosphate Buffered Saline pH 8.4 (1M stock solution of Sodium-Phosphate buffer includes 1M NaH2PO4 (Sodium phosphate monobasic (Sigma)) and 1M Na2HPO4 (Sodium phosphate dibasic (Sigma)) solutions), and 150 mM NaCl (Sigma). After fixative quenching with 100 mM Tris-HCl pH 7.5, 150 mM NaCl the cells were blocked and permeabilized using 0.5× Protein Free Blocking Buffer (PFBB, Thermo scientific) in PBS, 0.5 U/μl RNASIN™ Plus RNase and 0.1% Triton X100. Next, cells were stained overnight with 0.5×PFBB in PBS containing 2 U/μl RNASIN™ Plus RNase inhibitor, 0.1% Triton and 250 ng/μl of the desired intracellular antibody. After staining, the cells were gently washed 6 times with 10 ml 0.1×PFBB in PBS, filtered with 70 um nylon mesh and kept on ice until cell sorting.

Mice

Wild-type (WT) mice (C57Bl/6) were purchased from Harlan and housed in the Weizmann Institute animal facility. Trem2$^{-/-}$ knock-out (KO) mice were kindly provided by Prof. Marco Colonna (Turnbull et al., 2006). Foxp3$^{RFP}$ (Tg(Foxp3-RFP, -cre)) mice were kindly provided by Dr. Jakub Abramsaon. Mice were provided with food and water ad libitum and housed under a strict 12 hr light-dark cycle. Mice were provided with food and water ad libitum and housed under a strict 12 hr light-dark cycle. All experimental procedures were approved by the Institutional Animal Care and Use Committee (IACUC).

Bone Marrow Derived Cell Culture

Female mice were sacrificed by cervical dislocation. To isolate the bone marrow, femora and tibiae from one leg were removed, cleaned from flesh, and flushed with C10 culture medium (RPMI-1640 supplemented with 15% serum, 1%×100 non-essential amino acids, 10 mM HEPES buffer, 1 mM sodium pyruvate, 2 mM L-glutamine, and 50 μM b-mercaptoethanol) using a G21 needle syringe. Flushed bone marrow was filtered through a 70-μm cell strainer and spun down in a cold centrifuge at 300× g for 5 min. Cells were re-suspended in 250 μl RBC lysis solution (Sigma) per leg and incubated for 5 min at room temperature, washed, and resuspended in pre-warmed C10 medium. Cultures were set by plating 2×10$^6$ cells in 10 mL C10 supplemented with 20 ng/ml GM-CSF in a 100 mm non-tissue culture plate, and incubated under standard culture conditions (37° C., 5% CO2) (Day 0). On day 2 another 10 ml C10 medium supplemented with 20 ng/ml GM-CSF was added. On day 5, three quarter of the medium was replaced with fresh C10 medium supplemented with 20 ng/ml GM-CSF. On day 7, another 5 ml of C10 medium supplemented with 10 ng/ml GM-CSF. On day 8, non-adherent and loosely adherent cells in the culture supernatant were harvested by gentle washing and re-cultured in a fresh C10 medium supplemented with 10 ng/ml GM-CSF in new non-tissue culture plates and used as starting material for all BMDC experiments.

Tumor Cell Line

MCA-205 fibrosarcoma cell lines were kindly provided by Sergio Quezada group at UCL cancer institute, London, UK. Cells were cultured in DMEM (41965-039) medium supplemented with 10% heat-inactivated FBS, 1 mM sodium pyruvate, 2 mM l-glutamine, 1% penicillin-streptomycin (Thermo Fisher Scientific). Cells were cultured in 100 mm tissue culture plates in an incubator with humidified air and 5% CO2 at 37° C. Cell lines were validated for lack of mycoplasma infection using primers for mycoplasma-specific 16S rRNA gene region (EZPCR Mycoplasma Kit; Biological Industries).

Tumor Growth Measurements

Mice were inoculated intradermally (i.d.) with 5×10$^5$ MCA-205 cells suspended in 100 μl PBS on their right flank. At day 19, tumors volume was measured using a caliper. Tumor volume was assessed by measuring two diameters and calculated using the formula $X^2 \times Y \times 0.52$ (where X, smaller diameter and Y, larger diameter).

Isolation of Tumor Infiltrating Leukocytes

Tumor bearing mice were sacrificed at 10 and 19 days after tumor cell inoculation. The tumors underwent mechanical (gentleMACS™ C tube, Miltenyi Biotec Inc., San Diego, CA) and enzymatic digestion (0.1 mg/ml DNase type I (Roche), and 1 mg/ml Collagenase IV (Worthington) in RPMI-1640) for 15 min at 37° C. Cells then filtered through 100 μm cell strainer, washed with ice cold sorting buffer, centrifuged (5 min, 4° C., 300 g), and stained with fluorophores conjugated antibodies.

Human Peripheral Blood of Healthy Donors and Isolation of Peripheral Blood PBMC

Blood was taken from 3 healthy peripheral blood donors. The peripheral blood collecting samples is part of the (0220-15-TLV) approval. PBMCs were purified from fresh blood samples by sterile density gradient separation by density centrifugation media (Ficoll-Paque (GE Healthcare Life Sciences)) in a 1:1. Centrifugation (460 g, 25 min) was performed at 10° C., and the mononuclear cells were carefully aspirated and washed with ice-cold FACS buffer, followed by red blood lysis (Sigma-Aldrich) for 5 min at 4° C. and washing with ice cold FACS buffer.

Isolation of T-regulatory Cells from Mouse Tumors and Cervical Lymph Nodes

CD45+, TCR-β+, CD11b− and Foxp3+ (by endogenous Foxp3-RFP or anti Foxp3-APC conjugated antibody) cells were isolated from cervical lymph nodes or MCA-205 fiborosarcoma tumors from Foxp3$^{RFP}$ mice.

Flow Cytometry Single Cell Sorting for Mars-seq 2.0

Following staining, cells were washed and resuspended in cold washing buffer (0.5% BSA and 2 mM EDTA in PBS), stained with fluorophore conjugated anti-mouse CD45 antibody, and filtered through a 70-μm strainer. Before sorting, cells were stained with propidium iodide to exclude dead/dying cells. Cell sorting was performed using a BD FACSAria Fusion flow cytometer (BD Biosciences), gating for CD45+ cells after exclusion of dead cells and doublets. Single cells were sorted into 384-well capture plates containing 2 ml of lysis solution and barcoded poly(T) reverse-transcription (RT) primers for scRNA-seq as described previously (Keren-Shaul et. al 2019). Immediately after sorting, plates were spun down to ensure cell immersion into the lysis solution, snap-frozen on dry ice and stored at 80 C until further processing. Cells were analyzed using BD FACSDIVA software (BD Bioscience) and FlowJo software (FlowJo, LLC).

Mass Cytometry (CyToF)

Mouse tumor samples were processed as previously described to achieve single cell suspension. Tumor infiltrating immune cell were enriched using CD45 microbeads (Miltenyi Biotech). Cells were washed with CyTOF PBS and stained with Cisplatin viability stain for 1 min, washed twice and stained with extracellular antibodies cocktail at RT for 30 min. After extracellular staining, cells were washed twice and fixed using the CyTOF Nuclear Antigen Staining Buffer working solution [dilute the 4× Nuclear Antigen Staining Buffer Concentrate (1 part) with Nuclear Antigen Staining Buffer Diluent (3 parts)] for 30 minutes while pipetting every 10 min. Fixed cells were permed by using the CyTOF Perm-S buffer and stained with Intracellular antibodies cocktail for 30 min. Fixed cells were washed twice and resuspended in 4% Formaldehyde (Thermo Fisher) and kept at 4 C over night until acquisition day.

Stained and fixed cells were analyzed using the CyTOF 3 (Helios) system (FLUIDIGM). Data was processed using Cytobank.

Flow Cytometry Bulk Cell Sorting for qPCR Experiments

Cell populations were sorted using BD FACSAria Fusion flow cytometer (BD Biosciences). Prior to sorting, all samples were filtered through a 70-μm nylon mesh. Samples were CD11b+, (Gpnmb+/Pdpn+/Lyc6+) or (Cd11c+ MHCII high/mid). 5,000-10,000 cells were sorted into a low-bind Eppendorf tube containing 40 μl of lysis/binding buffer (Invitrogen). Immediately after sorting, tubes were spun down to ensure cell immersion into the lysis solution, snap-frozen on dry ice, and stored at −80° C. until processed.

RT-qPCR for Gene Enrichment Validation mRNA from cells sorted in to lysis/binding buffer was captured with 12 μl of Dynabeads oligo(dT) (Invitrogen), washed, and eluted at 85° C. with 10 μl of 10 mM Tris-Cl (pH 7.5). mRNA was reverse transcribed using SuperScript II (ThermoFisher) and cDNA was diluted 1:40 for qPCR measurement using the different genes primers (See Table 3).

TABLE 3

| Primer | Oligonucleotides Sequence | SEQ ID NO: |
|---|---|---|
| Actb_Left | GGAGGGGGTTGAGGTGTT | 1 |
| Actb_Right | TGTGCACTTTTATTGGTCTCAAG | 2 |
| Arg1_Left | ATTATCGGAGCGCCTTTCTC | 3 |
| Arg1_Right | AGCAGACCAGCTTTCCTCAG | 4 |
| Trem2_Left | CCCAAGTGGAACACAGCAC | 5 |
| Trem2_Right | GATGCTGGCTGCAAGAAACT | 6 |
| Tnf_Left | CCCTCACACTCAGATCATCTTCT | 7 |
| Tnf_Right | GCTACGACGTGGGCTACAG | 8 |
| Cxcl2_Left | AAAATCATCCAAAAGATACTGAACAA | 9 |
| Cxcl2_Right | CTTTGGTTCTTCCGTTGAGG | 10 |
| Il1b_Left | ACCCTGCAGTGGTTCGAG | 11 |
| Il1b_Right | CTTGCACAAGGAAGCTTGG | 12 |

Droplet-Based scRNA-seq (10× Chromium)

Fresh or INs-seq-fixed cells were FACS sorted into 0.04% PBS-BSA buffer or INs-seq collection buffer respectively. Cells were stained with trypan blue and counted using light microscopy and then loaded onto a 10× Chromium microfluidics system according to the manufacturer's guidelines. scRNA-seq 5' gene expression (GEX) libraries were generated using the 10× Genomics Chromium Single Cell 5' Kit v2 and the 10× Chromium Controller (10× Genomics) according to the 10× Single Cell 5' v2 protocol guidelines. The 5' mRNA library was sequenced with Illumina's NextSeq 500 using 75 paired-end reads.

MARS-seq 2.0 Library Preparation

Single-cell libraries were prepared as previously described (Keren-Shaul et al. 2019). In brief, mRNA from cell sorted into cell capture plates were barcoded and converted into cDNA and pooled using and automated pipeline. The pooled sample is then linearly amplified by T7 in vitro transcription, and the resulting RNA is fragmented and converted into sequencing-ready library by tagging the samples with pool barcodes and illumine sequences during ligation, RT, and PCR. Each pool of cells was tested for library quality and concentration is assessed as described earlier. Overall, barcoding was done on three levels: cell barcodes allow attribution of each sequence read to its cell of origin, thus enabling pooling; unique molecular identifiers (UMIs) allow tagging each original molecule in order to avoid amplification bias; and plate barcodes allow elimination of the batch effect.

mRNA Quality Comparison Between Fixation Methods Using RT-qPCR

Day 9 culture BMDCs were fixed according to the different fixation protocol guidelines including INS-seq (as described above), and stained for Cd11c. 5000 cells from each protocol were sorted directly into 40 μl of lysis binding buffer (Invitrogen). mRNA was captured with 12 μl of DYNABEADS™ oligo (dT) (Invitrogen) (magnetic beads) according to protocol. For DSP samples only, mRNA was reverse cross-linked by incubation with 6 mM dNTP, 150 mM Tris pH 8, 90 mM DTT, 0.1% Triton, 6 U/μl RNASIN™ Plus for 45 minutes at 25° C., followed by 5 minutes at 65° C. and then cooled to 4° C. For all fixation protocols each half of the mRNA material was either reverse transcribed or reverse transcribed and amplified (14 cycles) in the same reaction (RT-PCR). cDNA or amplified cDNA were diluted (1:40) and quantified in qPCR using mouse Actb primers.

Suppression Assay

Spleen was isolated from 11 weeks WT female (C57Bl/6) mouse and was dissociated into single-cell suspension and filtered through 70 mm cell strainer. Red blood cells were lysed with RBC lysis buffer (Sigma). Splenocytes were passed over CD8 T cell enrichment LS column (Miltenyi). Enriched CD8 T cells were labeled with Cell Proliferation dye eFluor™ 450 (Invitrogen) according to manufacturer's guidelines and co cultured with sterilely sorted intratumoral (MCA205) Cd11b+Gpnmb+ or Cd11b+Cxc3r1+ or Cd11b+Ccr2+ cells separately in a 1:1 ratio. T cells were then activated with CD3/CD28 Dynabeads (Thermo Fisher) according to the kit guidelines. The cells were co-cultured in TC 96 well plat round bottom (Conring) in C10 medium containing recombinant IL-2 (5 ng/ml) and 100 U/mL penicillin/streptomycin. For control, T cells were solo-cultured with or without activation. Cells were harvested after 72 hours, cell suspension was stained with CD8-APC/Cy7 to gate only T cells and T cell proliferation was measured in FACS analysis by Cell Proliferation dye eFluor™ 450 dilution.

Single-Cell RNA-Sequencing Analyses

Single Cell RNA Data Processing (10×)

The Cell Ranger Single Software Suite v.3.1.0 was used to perform sample alignment, de-multiplexing and UMI counting using the default parameters. A total of 82,223 single cells consisting of 17 samples (5 Fresh and 12 INs-seq samples) were collected, with the number of cells recovered per samples ranging from 343 to 9507. The mean reads per cells varied from 13,480 and 353,472 with median UMI of 561 to 8092 per cell. Low-quality cells were discarded if the number of expressed genes was smaller than 300. Cells were also removed if their mitochondrial gene expression were larger than 10 percent.

Chromium (10x) Data Integration and Clustering Analysis

For processing of both fresh and INs-seq scRNA-seq data, we used Seurat R package version 3.0. First, we performed filtering of the cells removing cells with less than 300 genes expressed or fraction of mitochondrial gene expression above 10 percent of total UMIs. Next, data for paired fresh and INs-seq samples were normalized using the NormalizeData function and integrated with correction for methods effects across datasets using FindIntegrationAnchors function. We performed Louvain clustering and dimensionality reduction using UMAP algorithm. Marker genes for each cluster have been identified using FindAllMarkers function and Wilcoxon test.

MARS-seq Processing scRNA-seq libraries (pooled at equimolar concentration) were sequenced on an Illumina NextSeq 500 at a median sequencing depth of ~40,000 reads per cell. Sequences were mapped to the mouse (mm10). Demultiplexing and filtering was performed as previously described, with the following adaptations: Mapping of reads was performed using HISAT (version 0.1.6); reads with multiple mapping positions were excluded. Reads were associated with genes if they were mapped to an exon, using the ensembl gene annotation database (embl release 90). Exons of different genes that shared a genomic position on the same strand were considered as a single gene with a concatenated gene symbol. The level of spurious unique molecular identifiers (UMIs) in the data were estimated by using statistics on empty MARS-seq wells, and excluded rare cases with estimated noise >5% (median estimated noise over all experiments was 2%).

Results

Figure 10A:
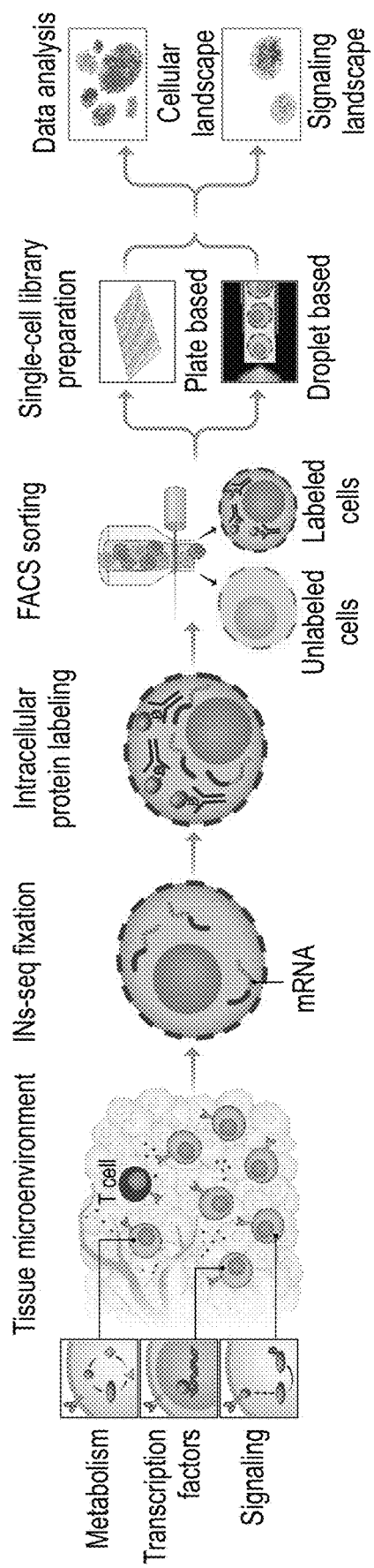

INs-seq: An Integrated Technology for scRNA-seq and Intracellular Protein Measurements In order to integrate the intracellular signaling state and the cellular transcriptional profile, INs-seq, an integrative technology for intracellular protein immuno-detection was developed followed by scRNA-seq (FIG. 10A). In this protocol, cells are fixed and permeabilized using a fixative based on methanol and ammonium sulfate solutions, which precipitates proteins and inhibits enzymatic activity, and enable both RNA preservation and immuno-intracellular staining (STAR methods). The permeabilized cells can then be intracellularly labeled with fluorophore conjugated antibodies and FACS sorted according to their intracellular fluorescent signal intensity, followed by scRNA-seq using plate based or microfluidic based approaches (STAR methods).

Figure 10C:
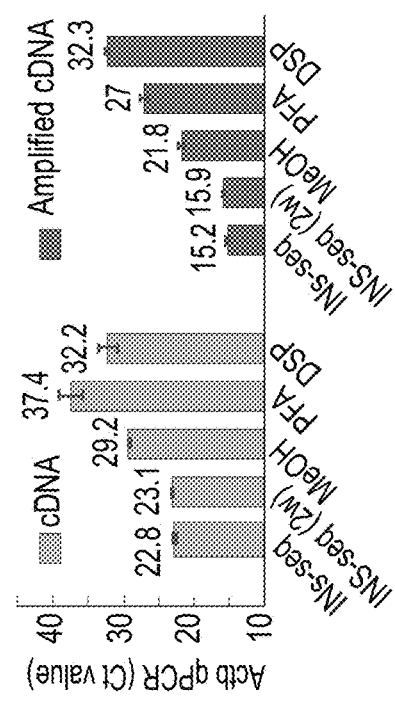
Figure 10B:
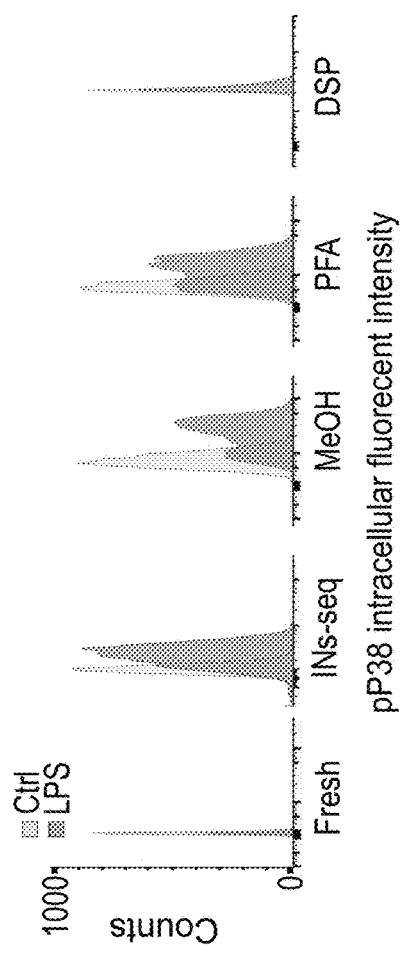

To evaluate INs-seq efficiency in preserving mRNA and allowing simultaneous intracellular labeling INs-seq fixation was compared to three commonly used fixation methods: paraformaldehyde (PFA), methanol (MeOH) and DSP (dithiobis succinimidyl propionate). Mice bone marrow derived cells were differentiated in the presence of GM-CSF (BMDC culture) and the culture was stimulated with LPS for 20 minutes. The cultured cells were processed by either INs-seq or the other four fixation methods. Cells were stained for the extracellular markers CD11c and Ly6G and sorted for CD11c$^+$, Ly6G$^-$ (BMDC) and the intracellular active form of the p38 MAPK, Phospho-p38 (Thr180/Tyr182) (pP38). Cells processed by PFA, MeOH and INs-seq (but not DSP), showed a clear fluorescent pP38 signal (FIG. 10B). Further, INs-seq fixation was compatible with a wide range of commonly used FACS fluorophores. In order to quantify preservation of mRNA by the different fixation protocols, mRNA was extracted from 5000 sorted BMDC, cDNA was generated and cDNA was amplified from the isolated cells. Quantitative PCR (qPCR) measurement of the housekeeping gene beta-actin (Actb) showed marked difference between the protocols (FIG. 10C). INs-seq preserved 84 fold more Actb mRNA molecules compared with the second-best fixation method (methanol fixation), and more than 600 folds over PFA and DSP. Additionally, INs-seq enabled almost complete preservation of mRNA of fixed cells stored in –20° C. up to at least two weeks (FIG. 10C). Importantly, INs-seq fixed samples demonstrate minor reduction in mRNA detection when compared with fresh non-fixed samples.

In order to further examine the quality of INs-seq fixation, the present inventors constructed scRNA-seq libraries using the droplet-based chromium platform from fresh and INs-seq fixed BMDC cells. They used the Seurat integration workflow to integrate INs-seq and fresh samples and clustered them together (Stuart et al., 2019). INs-seq processed cells display a 50-60 percent reduction in the number of unique molecular identifiers (UMI count) per cell compared to fresh cells (FIG. 10D). Yet, this reduction in UMI count was uniform and not biased towards any specific cell type. Therefore, despite this mRNA loss, INs-seq preserves the same cell populations distribution observed in the fresh, non-fixed cells (FIGS. 10E-F). Compared to scRNA-seq of fresh cells, INs-seq preferably samples long genes (>10 Kb), including non-coding RNA, over short genes (<1000 bp), suggesting that some RNA fragmentation is still occurring during sample processing. However, clustering and projection of the fresh and INs-seq data on the same manifold, identifies the same differential genes and dynamic range between the cell populations (FIG. 10F). To evaluate the robustness and clinical potential of INs-seq, human peripheral blood mono-nuclear (PBMC) samples were fixed (STAR methods). Comparison between fresh and INs-seq fixed CD45$^+$ immune blood cells shows an overall similarity in cell population distributions, except a notable enrichment of one monocyte population in the INs-seq samples (FIGS. 10G-H). Together, these results demonstrate the efficiency of INs-seq in labeling intracellular proteins while preserving the mRNA content in single cells.

INs-seq Identifies Dendritic Cells as a pP38 Negative Fraction in BMDC Culture

Figure 11A:
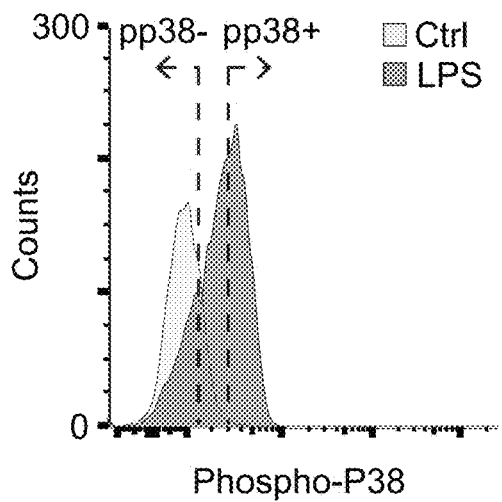
Figure 11B:
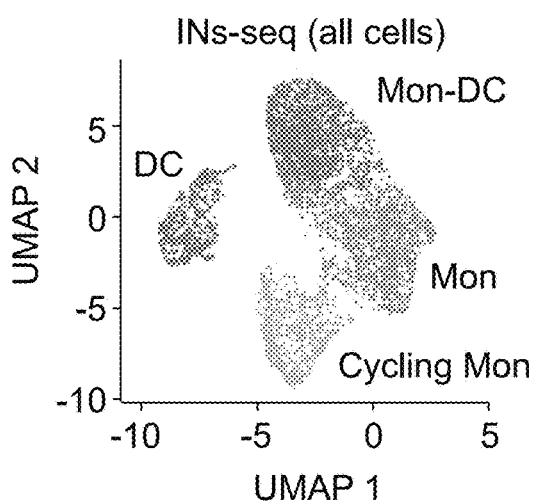
Figure 11C:
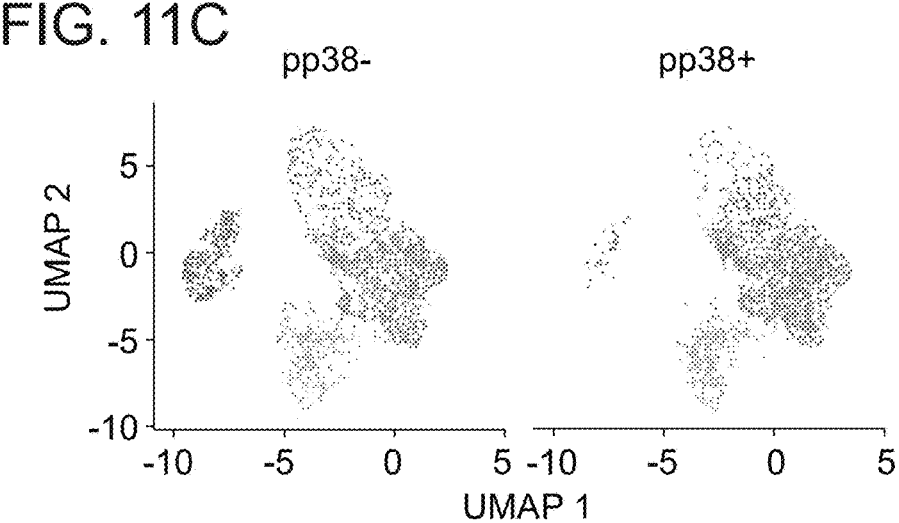
Figure 11D:
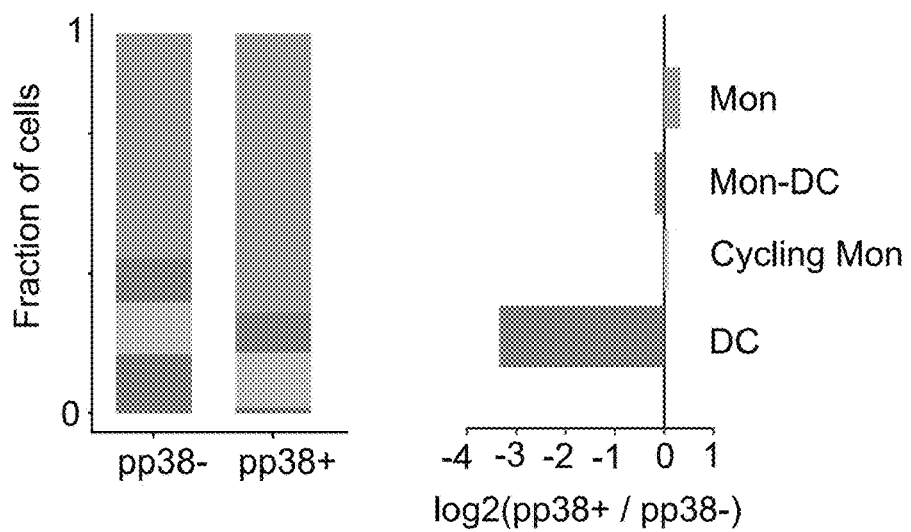

The myeloid compartment is composed of diverse cell types and states that respond differently to environmental signals (Glass & Natoli, 2016; Jaitin et al., 2016). To better understand the complexity of the myeloid response to pathogen signals, the present inventors stimulated the bone marrow culture with LPS for 20 minutes and performed INs-seq fixation and intracellular staining with fluorescent Phospho-p38 (Thr180/Tyr182) a downstream component of the TLR4 signaling cascade (Amit et al., 2009; H. Kumar et al., 2011). The BMDC culture cells were then FACS sorted according to the intensity of their pP38 signal, and processed using the chromium platform (FIG. 11A). Using the Seurat integration and clustering workflow, 4 clusters of cells were identified from the BMDC scRNA-seq data, including monocytes, cycling monocytes, dendritic cells (DC) and a monocyte-DC population (FIG. 11B). By quantification of pP38 enrichment score in each cluster, based on its fraction in the pP38$^+$ over pP38$^-$ populations, a significant enrichment in the dendritic cell population was identified. The DC (e.g. expressing CCR7, CCL22, and MHCII pathway) population was dramatically diminished in the pP38 positive fraction (FIGS. 11C-D).

Figure 11E:
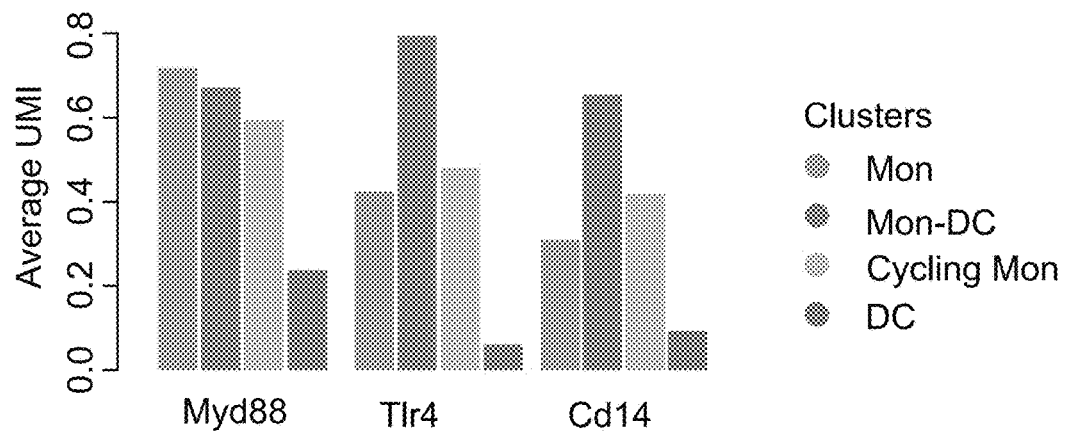
Figure 11F:
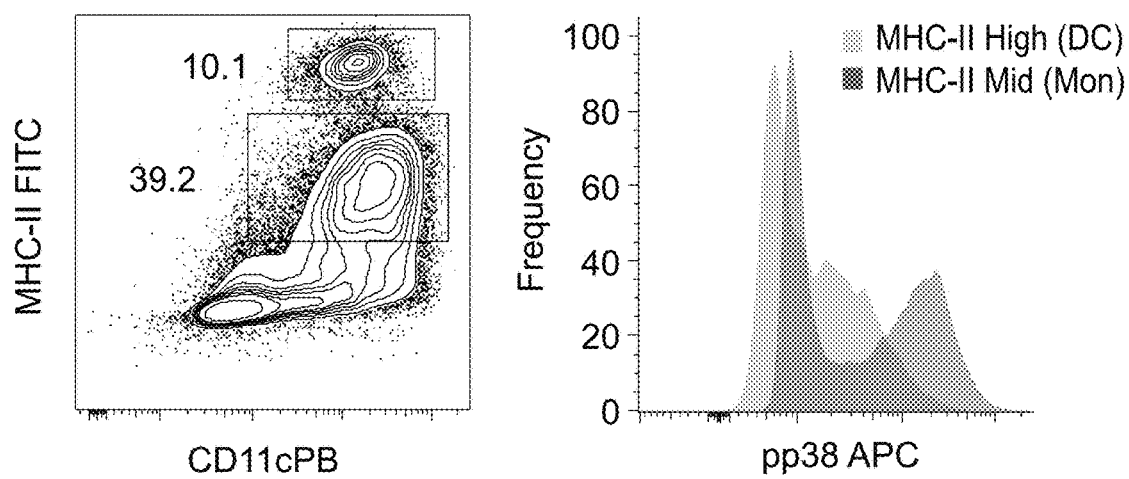
Figure 11G:
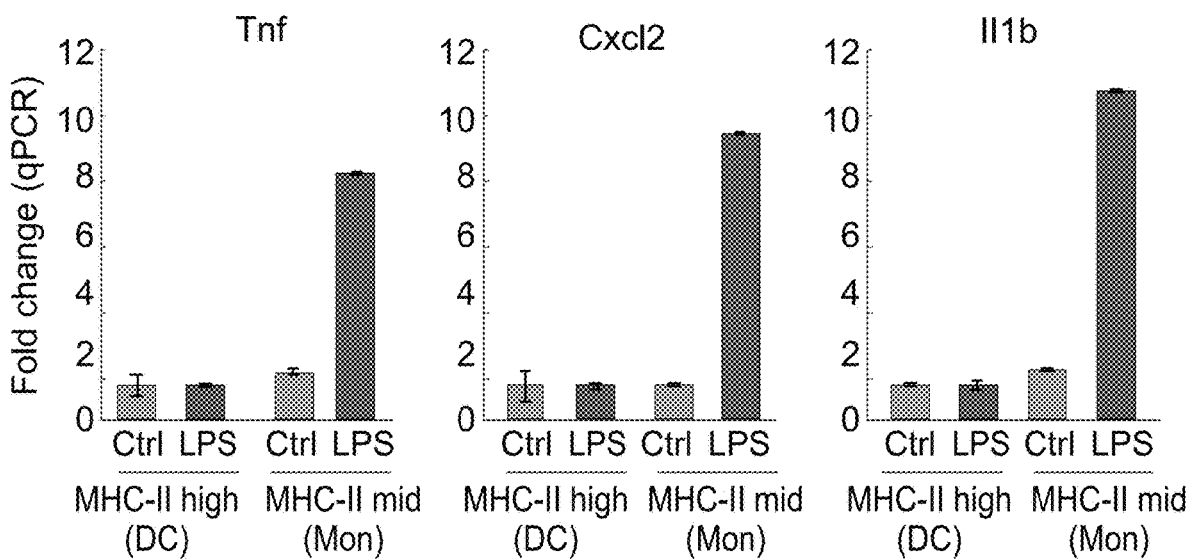

LPS is mainly sensed through the TLR4 pathway and its co-receptor CD14, which regulates TLR4 endocytosis (Zanoni et al., 2011). Comparison of the expression of TLR4 and CD14 in the BMDC culture, showed diminished gene expression of TLR4, CD14 and the major TLR4 signaling adaptor MyD88 in DC compared to the other cell populations in the culture (FIG. 11E). Correspondingly, FACS analysis of monocytes (CD14$^{high}$ CD11c$^+$) cells showed high pP38 signal compared to the DC (CD14$^{low}$ CD11c$^+$) population. In line with these findings, MHCII$^{high}$ CD11c$^+$ (DC) showed decreased pP38 signal compared to MHCII$^{mid}$ Cd11c$^+$ (Monocytes) (Helft et al., 2015) FIG. 11F). Moreover, LPS stimulation of BMDC resulted in a minor inflammatory response in the DC population, compared with a massive response of the monocyte populations (FIG. 11G). In summary, the present inventors have demonstrated that INs-seq is a robust technology for single cell characterization of transcriptional and signaling activity and identified that signaling downstream of LPS stimulation is blunted in DC, including the pP38 MAPK and downstream inflammatory cytokines.

Comprehensive Cell Type Characterization by Transcription Factor Targeting

The complex gene expression programs that underlie development, differentiation, and environmental responses are determined by binding of sequence-specific transcription factors. TF combinations may faithfully define the cell developmental trajectory together with its prospective to respond to extracellular signals and can potentially be applied for precise cell characterization of diverse immune subsets. Thus far, genetic engineering of TF-reporters, with all of its limitations, was the major approach for such efforts and have been an instrumental tool for discovery of novel immune populations. The transcription factor Foxp3, a master regulator of regulatory T cell (Treg) development and function, is the only discriminative marker to purify Treg from other T cells (Kim & Rudensky, 2006). Currently, cell surface markers used for purification and characterization of Treg in different tissues and pathologies are limited (Chen & Oppenheim, 2011). In order to assess INs-seq efficiency for in vivo mapping of Treg, a Foxp3RFP transgenic mouse expressing a fluorescent Foxp3 reporter was used (Tg (Foxp3-RFP, -cre); methods), where the Foxp3 promoter drives the expression of RFP and Cre recombinase. The present inventors enriched for Treg from Foxp3RFP cervical lymph nodes (cLN) by either sorting TCR$^+$RFP$^+$ cells or applying the INs-seq protocol and sorting antibody stained TCR$^+$Foxp3$^+$ cells (FIG. 12A). ScRNA-seq libraries were constructed from the unfixed Foxp3 RFP$^+$ and fixed Foxp3$^+$ cells (Methods). Analysis of the scRNA-seq data of 5483 cells, created a map of the cell types profiled in the Foxp3$^+$ fixed and RFP$^+$ unfixed cLN samples, and identified similar Treg enrichments using the genetic and antibody based Foxp3+ strategies (FIG. 12B; 80% and 60% respectively). Similarly, isolated Treg from both strategies demonstrated expression of the same Treg gene modules and markers.

Treg are key mediators of immunosuppression within the TME (Magnuson et al., 2018; Togashi et al, 2019). In order to compare the molecular profiles of cLN and tumor Treg, infiltrating lymphocytes (TIL) were isolated, and INs-seq was applied to profile the TME CD45$^+$TCRb$^+$Foxp3$^+$ and CD45$^+$TCRb$^+$Foxp3$^-$ cell populations. Analysis identified that the Foxp3$^+$ population contained Treg cells and related transcriptomic signature, comprising high level of expression of Foxp3, Ctla4, Il2ra and different members of TNF-receptor family (e.g. Tnfrsf4 and Tnfrsf18). In line with previous studies, Treg isolated from cLN expressed a gene module related to naïve and circulating T cells, such as Ccr7, Tcf7 and Lef1 (Ricardo Miragaia et al., 2019; Tong et al., 2019), while Treg isolated from the TME exhibited an active Treg suppressive phenotype, expressing high levels of Gzmb, Ccr2 and various TNF receptor family members 18 and 9 (Azizi et al., 2018; Cao et al., 2007) (FIG. 12C). In summary, by targeting the Treg specific TF, Foxp3, from mice circulation (LN) and TME the application of the INs-seq technology to combine TF labeling with single cell RNA-seq was demonstrated.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of analyzing cellular RNA comprising:
   (a) contacting a plurality of cells with a solution of alcohol under conditions that fixes said plurality of cells;
   (b) removing said solution of alcohol from the plurality of cells;
   (c) contacting the plurality of cells with a 2-5 M solution of ammonium sulfate;
   (d) removing said solution of ammonium sulfate from the plurality of cells;
   (e) contacting said plurality of cells with a buffer,
   (f) labeling an intracellular protein or nucleic acid of the plurality of cells with a tag to generate labeled cells;
   (g) isolating said labeled cells from said plurality of cells;
   (h) isolating the RNA from the labeled cells; and
   (i) analyzing the RNA of the labeled cells, thereby analyzing cellular RNA.

2. The method of claim 1, further comprising barcoding each cell of said plurality of cells prior to step (a) with an individual barcode.

3. The method of claim 2, wherein said analyzing is effected at the single cell level.

* * * * *

SEQUENCE LISTING

<160> NUMBER OF SEQ ID NOS: 12

<210> SEQ ID NO 1
<211> LENGTH: 18
<212> TYPE: DNA
<213> ORGANISM: Artificial sequence
<220> FEATURE:
<223> OTHER INFORMATION: Single strand DNA oligonucleotide

<400> SEQUENCE: 1 ggaggggggtt gaggtgtt                    18

```
<210> SEQ ID NO 2
<211> LENGTH: 23
<212> TYPE: DNA
<213> ORGANISM: Artificial sequence
<220> FEATURE:
<223> OTHER INFORMATION: Single strand DNA oligonucleotide

<400> SEQUENCE: 2
tgtgcacttt tattggtctc aag                                              23

<210> SEQ ID NO 3
<211> LENGTH: 20
<212> TYPE: DNA
<213> ORGANISM: Artificial sequence
<220> FEATURE:
<223> OTHER INFORMATION: Single strand DNA oligonucleotide

<400> SEQUENCE: 3
attatcggag cgcctttctc                                                  20

<210> SEQ ID NO 4
<211> LENGTH: 20
<212> TYPE: DNA
<213> ORGANISM: Artificial sequence
<220> FEATURE:
<223> OTHER INFORMATION: Single strand DNA oligonucleotide

<400> SEQUENCE: 4
agcagaccag ctttcctcag                                                  20

<210> SEQ ID NO 5
<211> LENGTH: 19
<212> TYPE: DNA
<213> ORGANISM: Artificial sequence
<220> FEATURE:
<223> OTHER INFORMATION: Single strand DNA oligonucleotide

<400> SEQUENCE: 5
cccaagtgga acacagcac                                                   19

<210> SEQ ID NO 6
<211> LENGTH: 20
<212> TYPE: DNA
<213> ORGANISM: Artificial sequence
<220> FEATURE:
<223> OTHER INFORMATION: Single strand DNA oligonucleotide

<400> SEQUENCE: 6
gatgctggct gcaagaaact                                                  20

<210> SEQ ID NO 7
<211> LENGTH: 23
<212> TYPE: DNA
<213> ORGANISM: Artificial sequence
<220> FEATURE:
<223> OTHER INFORMATION: Single strand DNA oligonucleotide

<400> SEQUENCE: 7
ccctcacact cagatcatct tct                                              23

<210> SEQ ID NO 8
<211> LENGTH: 19
<212> TYPE: DNA
<213> ORGANISM: Artificial sequence
<220> FEATURE:
<223> OTHER INFORMATION: Single strand DNA oligonucleotide
```

```
<400> SEQUENCE: 8
gctacgacgt gggctacag                                          19

<210> SEQ ID NO 9
<211> LENGTH: 26
<212> TYPE: DNA
<213> ORGANISM: Artificial sequence
<220> FEATURE:
<223> OTHER INFORMATION: Single strand DNA oligonucleotide

<400> SEQUENCE: 9
aaaatcatcc aaaagatact gaacaa                                  26

<210> SEQ ID NO 10
<211> LENGTH: 20
<212> TYPE: DNA
<213> ORGANISM: Artificial sequence
<220> FEATURE:
<223> OTHER INFORMATION: Single strand DNA oligonucleotide

<400> SEQUENCE: 10
ctttggttct tccgttgagg                                         20

<210> SEQ ID NO 11
<211> LENGTH: 18
<212> TYPE: DNA
<213> ORGANISM: Artificial sequence
<220> FEATURE:
<223> OTHER INFORMATION: Single strand DNA oligonucleotide

<400> SEQUENCE: 11
accctgcagt ggttcgag                                           18

<210> SEQ ID NO 12
<211> LENGTH: 19
<212> TYPE: DNA
<213> ORGANISM: Artificial sequence
<220> FEATURE:
<223> OTHER INFORMATION: Single strand DNA oligonucleotide

<400> SEQUENCE: 12
cttgcacaag gaagcttgg                                          19
```